(12) United States Patent
Fabrega Sanchez et al.

(10) Patent No.: US 11,733,744 B2
(45) Date of Patent: Aug. 22, 2023

(54) DISPLAY-SIDE ANTENNA

(71) Applicant: QUALCOMM Incorporated, San Diego, CA (US)

(72) Inventors: Jorge Fabrega Sanchez, San Diego, CA (US); Mohammad Ali Tassoudji, San Diego, CA (US); Kevin Hsi-Huai Wang, San Diego, CA (US); Alberto Cicalini, Tortona (IT); Peter Lien, Carlsbad, CA (US)

(73) Assignee: QUALCOMM Incorporated, San Diego, CA (US)

( * ) Notice: Subject to any disclaimer, the term of this patent is extended or adjusted under 35 U.S.C. 154(b) by 162 days.

(21) Appl. No.: 17/241,657

(22) Filed: Apr. 27, 2021

(65) Prior Publication Data

US 2021/0333842 A1 Oct. 28, 2021

Related U.S. Application Data

(60) Provisional application No. 63/016,612, filed on Apr. 28, 2020.

(51) Int. Cl.
*G06F 1/16* (2006.01)
*H01Q 1/24* (2006.01)
*H01Q 1/22* (2006.01)

(52) U.S. Cl.
CPC ......... *G06F 1/1698* (2013.01); *H01Q 1/2266* (2013.01); *H01Q 1/243* (2013.01)

(58) Field of Classification Search
CPC ..... G06F 1/1698; H01Q 1/2266; H01Q 1/243
See application file for complete search history.

(56) References Cited

U.S. PATENT DOCUMENTS

2013/0076575 A1* 3/2013 Mai .................. H01Q 1/243
343/702
2016/0344089 A1* 11/2016 Baik .................. H01Q 1/368
(Continued)

FOREIGN PATENT DOCUMENTS

WO 2015164010 A1 10/2015
WO 2019103966 A1 5/2019

OTHER PUBLICATIONS

International Search Report and Written Opinion—PCT/US2021/029647—ISA/EPO—dated Aug. 12, 2021.

*Primary Examiner* — Junpeng Chen
(74) *Attorney, Agent, or Firm* — Arent Fox, LLP and Qualcomm, Incorporated

(57) ABSTRACT

Apparatus, methods, and computer-readable media for implementing a display-side antenna are disclosed herein. An example apparatus for wireless communication includes a housing and a display device supported by the housing. The example display device includes at least a glass cover and a panel positioned between the glass cover and an internal surface of the housing. The panel may be configured to output graphical content for presentment on the glass cover via pixels arranged within a visible area of the panel. The example apparatus also includes an antenna array. The antenna array may be configured to facilitate wireless communication at the apparatus. The antenna array may be positioned to overlap a portion of the visible area of the panel and configured to allow graphical content output by the panel to display on the glass cover at the overlapped portion of the visible area.

28 Claims, 15 Drawing Sheets

(56) References Cited

U.S. PATENT DOCUMENTS

| | | | | |
|---|---|---|---|---|
| 2017/0090098 A1* | 3/2017 | Chai | .................... | G02B 6/0041 |
| 2017/0237152 A1* | 8/2017 | Lee | ...................... | G06F 1/1643 |
| | | | | 343/702 |
| 2018/0188432 A1* | 7/2018 | Choi | ................... | H01L 51/5281 |
| 2019/0278130 A1 | 9/2019 | Lim et al. | | |
| 2020/0021016 A1* | 1/2020 | Son | ...................... | H01Q 21/065 |
| 2020/0192542 A1* | 6/2020 | Chang | ............... | H04W 52/0229 |
| 2020/0411969 A1* | 12/2020 | Wang | .................... | H01Q 1/273 |

\* cited by examiner

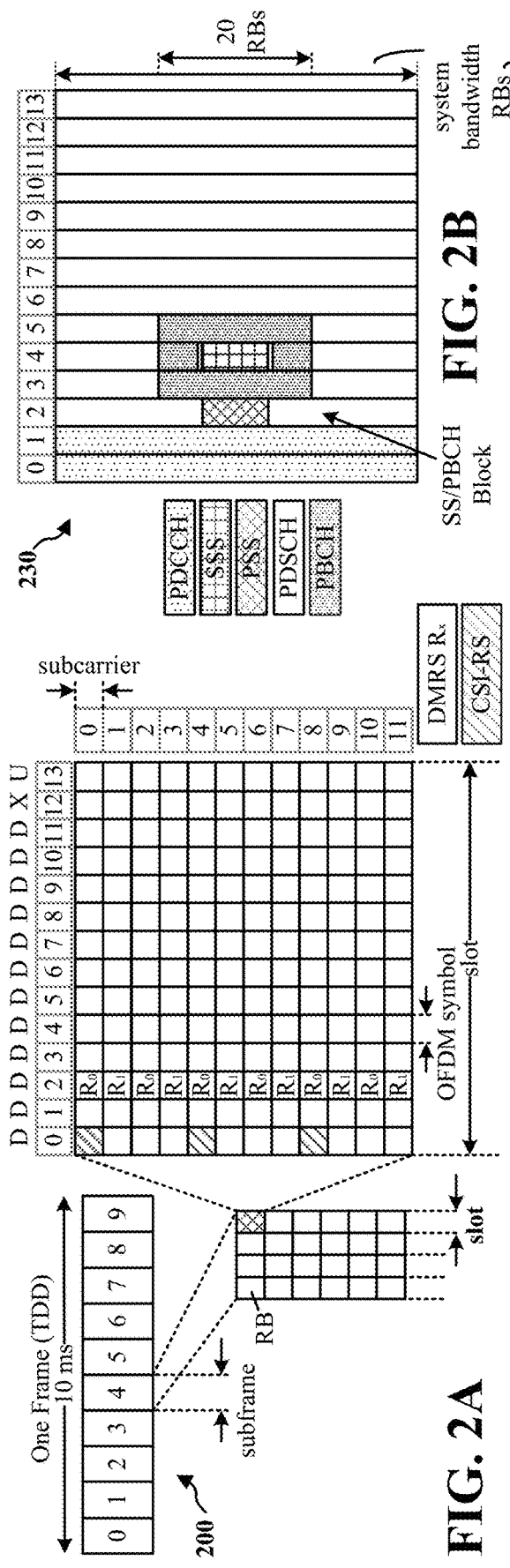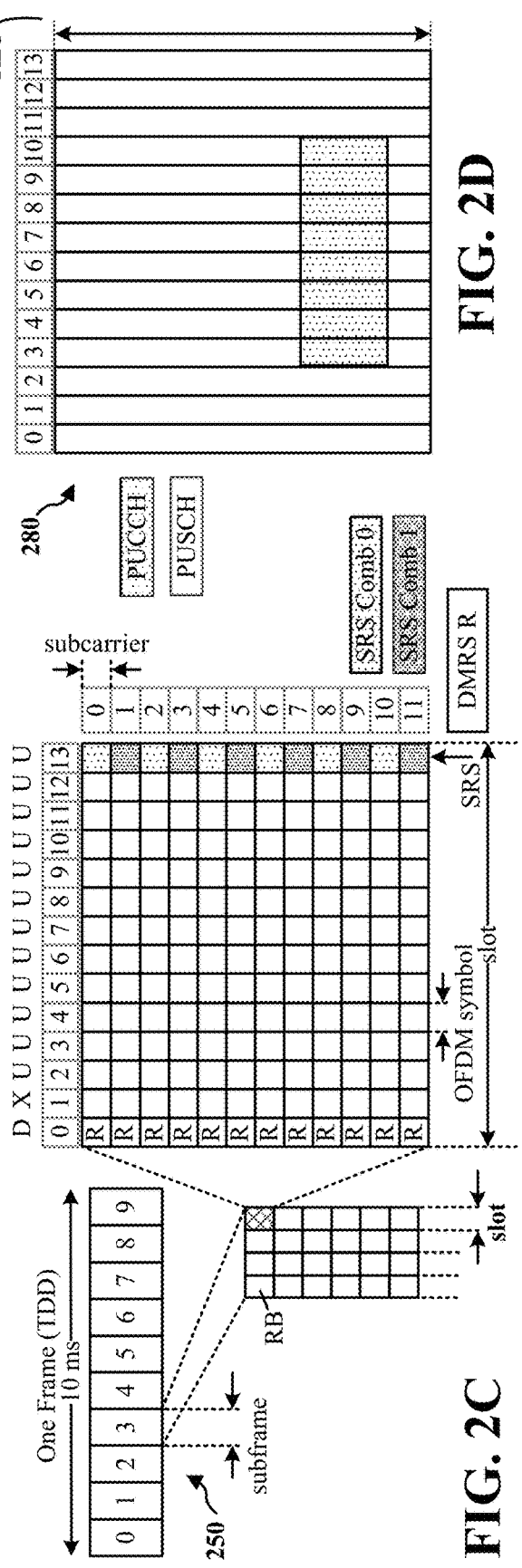

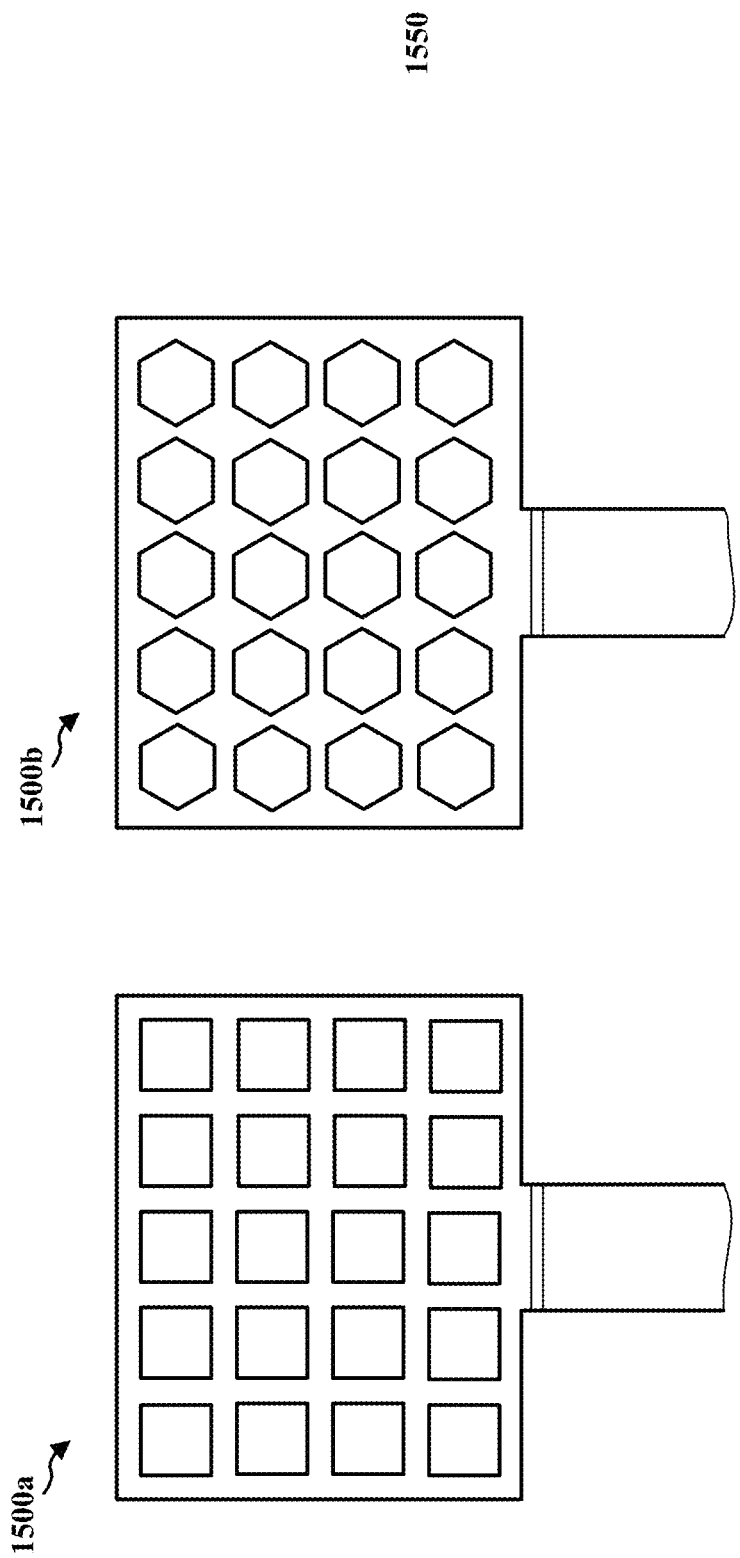

DISPLAY-SIDE ANTENNA

CROSS-REFERENCE TO RELATED APPLICATION

This application claims the benefit of U.S. Provisional Application Ser. No. 63/016,612, entitled "SIDE-FED DISPLAY GLASS ANTENNA" and filed on Apr. 28, 2020, the disclosure of which is expressly incorporated by reference herein in its entirety.

BACKGROUND

Technical Field

The present disclosure relates generally to communication systems, and more particularly, to wireless communication utilizing millimeter wave (mmW) antennas.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, an apparatus for wireless communication is provided. The apparatus includes a housing, and a display device supported by the housing. The display device includes at least a transparent cover, and a panel positioned between the cover and an internal surface of the housing. The panel is configured to output graphical content for presentment on the cover via pixels arranged within a visible area of the panel. The apparatus further includes an antenna array. The antenna array is configured to facilitate wireless communication at the apparatus. The antenna array is positioned to overlap a portion of the visible area of the panel. The antenna array is configured to allow graphical content output by the panel to display on the cover at the overlapped portion of the visible area.

In another aspect of the disclosure, an apparatus for wireless communication includes a housing. The apparatus further includes means for presenting graphical content. The means for presenting is disposed in the housing. The apparatus also includes means for transmitting or receiving wireless millimeter wave signals. The means for transmitting or receiving may be disposed on a side of the means for presenting which is visible to a user of the apparatus.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIGS. 15A and 15B illustrate top views of example antenna elements, in accordance with one or more techniques disclosed herein.

DETAILED DESCRIPTION

Figure 1:
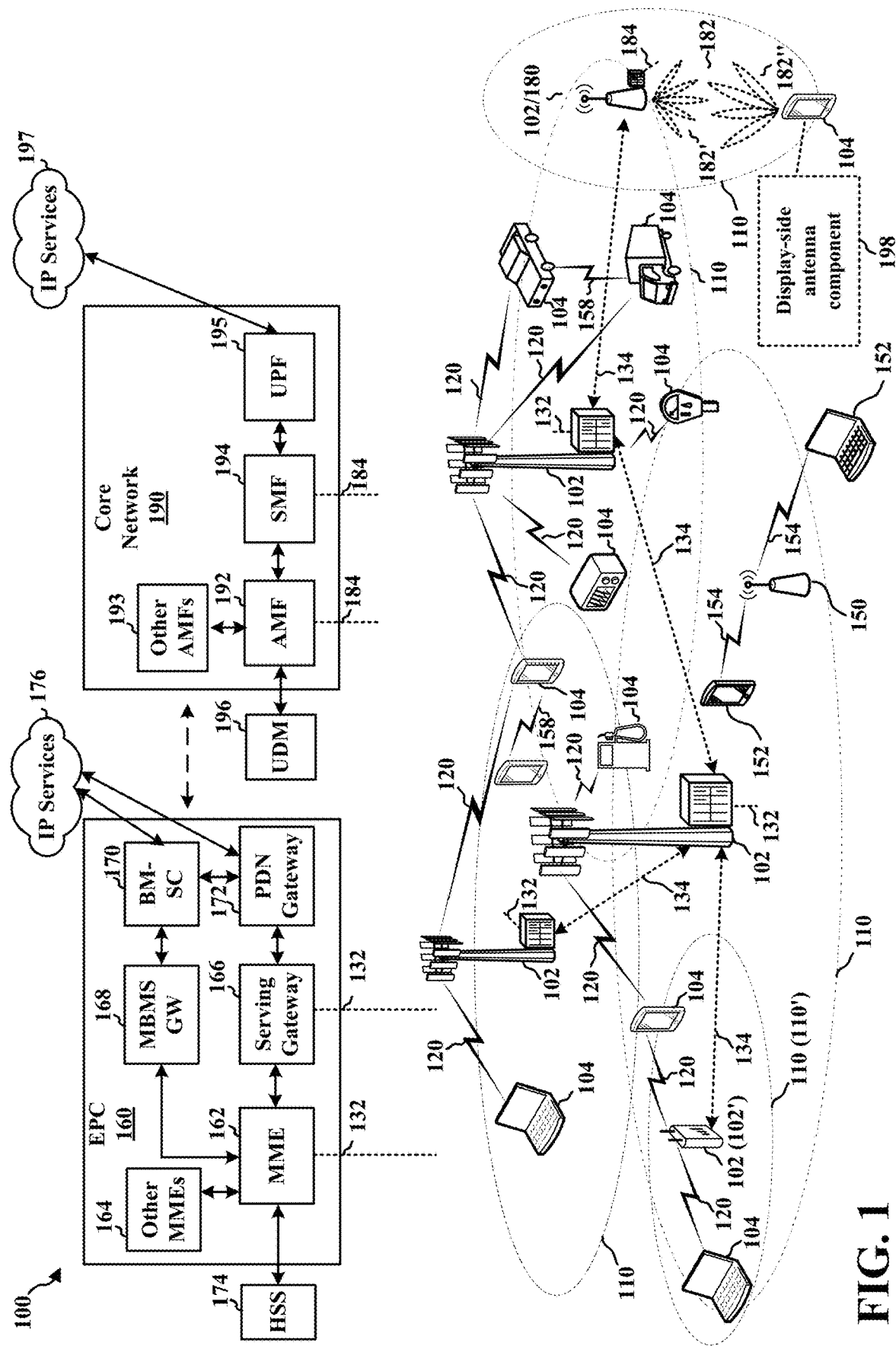
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" may be used interchangeably.

Example techniques disclosed herein provide for a display-side antenna. The antenna may include an antenna array that is printed on an external or internal surface of the display glass or other transparent material, or formed within the display glass/material or other areas within the display device, such as within a display panel. A connector may operate as a conduit of wireless communication signals between the antenna array and a transceiver. The transceiver may be included in an antenna module and/or a processing unit.

In some examples, the antenna array may be printed using a conductive transparent material. In some examples, one or more conductive properties of the conductive transparent material may enable the antenna array to facilitate transmitting and/or receiving signals (e.g. over-the-air). In some examples, one or more transparent properties of the conductive transparent material may enable the antenna array to continue facilitating the transmitting and/or receiving of signals without disturbing the viewing area of the display. In other examples, the antenna array may be printed or otherwise manufactured using a mesh geometry. The material composition of the mesh element need not be itself transparent, but the configuration of the mesh enables a user to see the underlying display.

In some examples, the connector provides a side feed to the antenna array. For example, a side-fed display glass antenna may extend to an edge of the display glass and a first side of the connector may connect to the side-fed display glass antenna at the edge of the display glass. In some such examples, the side-fed display glass antenna may continue to facilitate the transmitting and/or receiving of signals without disturbing the viewing area of the display as the edge of the display glass may extend past the viewing area of the display.

In some examples, the positioning of the antenna may enable increasing the overall spherical coverage of the apparatus. For example, the antenna may provide directional radiation coverage along a first axis while additional antenna modules may provide directional radiation coverage along a second and/or third axis. For example, the first axis may be perpendicular to display panel and/or an external surface of the display, while the second and/or third axis may be parallel to the display pane and/or external surface of the display.

In some examples, the positioning of the antenna on the side of the display visible to a user may reduce or mitigate occurrences of hand blockage. For example, as the viewing area of the display is not disturbed by the presence of the antenna, and the antenna may provide directional radiation coverage along the first axis, it is not likely that a hand will block the coverage provided by the antenna.

Other example benefits are described throughout this disclosure.

Although the following description provides examples directed to 5G NR, the concepts described herein may be applicable to other similar areas, such as LTE, LTE-A, CDMA, GSM, a wireless local area network (WLAN, e.g., as described in a IEEE 802.11 standard), a wireless personal area network (WPAN, e.g., as described in a IEEE 802.15 standard, as may be developed pursuant to Bluetooth communications, etc.), near-field communications (NFC), and/or other wireless technologies, in which increased overall spherical coverage may be beneficial.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, and/or antenna arrays to facilitate the beamforming.

The electromagnetic spectrum is often subdivided by various authors or entities into different classes, bands, channels, or the like, based on frequency/wavelength. For example, in 5G NR two initial operating bands have been identified as frequency range designations FR1 (410 MHz-7125 MHz) and FR2 (24250 MHz-52600 MHz). Even though a portion of FR1 is greater than 6 GHz (>6000 MHz), FR1 is often referred to (interchangeably) as a Sub-6 GHz band in various documents and articles regarding 5G NR topics. A similar nomenclature issue sometimes occurs with regard to FR2 in various documents and articles regarding 5G NR topics. While a portion of FR2 is less than 30 GHz (<30000 MHz), FR2 is often referred to (interchangeably) as a millimeter wave band. However, some authors/entities tend to define wireless signals with wavelengths between 1-10 millimeters as falling within a millimeter wave band (30 GHz-300 GHz).

With the above examples in mind, unless specifically stated otherwise, it may be understood that the term "sub-6 GHz" if used herein by way of example may represent all or part of FR1 for 5G NR. Further, unless specifically stated otherwise, it may be understood that the term "millimeter wave" as used herein by way of example may represent all or part of FR2 for 5G NR and/or all or part of a 30 GHz-300 GHz waveband. "Millimeter wave" may also be used to refer to bands having higher frequencies, such as THz or sub-THz bands, in some scenarios. It may also be understood that the terms "sub-6 GHz" and "millimeter wave," are intended to represent modifications to such example frequency bands that may occur do to author/entity decisions regarding wireless communications, e.g., as presented by example herein.

It may be understood that the above examples are not necessarily intended to limit claimed subject matter. For example, unless specifically recited, claimed subject matter relating to wireless communications is not necessarily intended to be limited to any particular author/entity defined frequency band, or the like.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication. As an example, in FIG. 1, the UE 104 may include a display-side antenna component 198 configured to increase overall spherical coverage of the UE 104 without disturbing the viewing area of the UE 104. For example, the display-side antenna component 198 may include a housing and a display device supported by the housing. In some examples, the display device may include a glass cover. The display device may also include a panel positioned between the glass cover and an internal surface of the housing. In some examples, the panel may be configured to output graphical content for presentment on the glass cover via pixels arranged within a visible area of the panel. The example display-side antenna component 198 may also include an antenna array embedded in the glass cover. In some examples, the antenna array may be configured to facilitate wireless communication at the apparatus. In some examples, the antenna array may be positioned to overlap a portion of the visible area of the panel and may be configured to allow graphical content output by the panel to display on the glass cover at the overlapped portion of the visible area.

Still referring to FIG. 1, in some examples, the display-side antenna component 198 may include an antenna element printed on an external surface of a display device. In some examples, the antenna element may include an antenna feed extending from the antenna element. The example display-side antenna component 198 may also include an antenna module configured to facilitate wireless communication via the receiving of or transmitting of signals at the antennal element. Additionally, the example display-side antenna component 198 may include an FPC bonded to the display device. In some examples, the FPC may include a first side connected to the antenna feed and a second side connected to the antenna module. Other examples of the display-side antenna component 198 include an antenna or antenna array attached to an inside surface of the glass cover. In some such examples, a spacer between the display panel and the glass cover ensures that the antenna or array is spaced an appropriate distance from a ground plane formed by a portion of the display panel. In some examples, an adhesive may be configured as a spacer. In other examples, the display-side antenna component 198 includes an antenna or array formed as a portion of the display panel or a touch sensor associated with the display panel. In some embodiments, the display-side antenna component 198 includes any antenna and/or antenna array which is disposed on a side of a display panel of the UE 104 which is visible to a user of the UE 104.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2^\mu$ slots/subframe. The subcarrier spacing and symbol length/duration are a function of the numerology. The subcarrier spacing may be equal to $2^\mu * 15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A-2D provide an example of slot configuration 0 with 14 symbols per slot and numerology $\mu=2$ with 4 slots per subframe. The slot duration is 0.25 ms, the subcarrier spacing is 60 kHz, and the symbol duration is approximately 16.67 $\mu$s.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
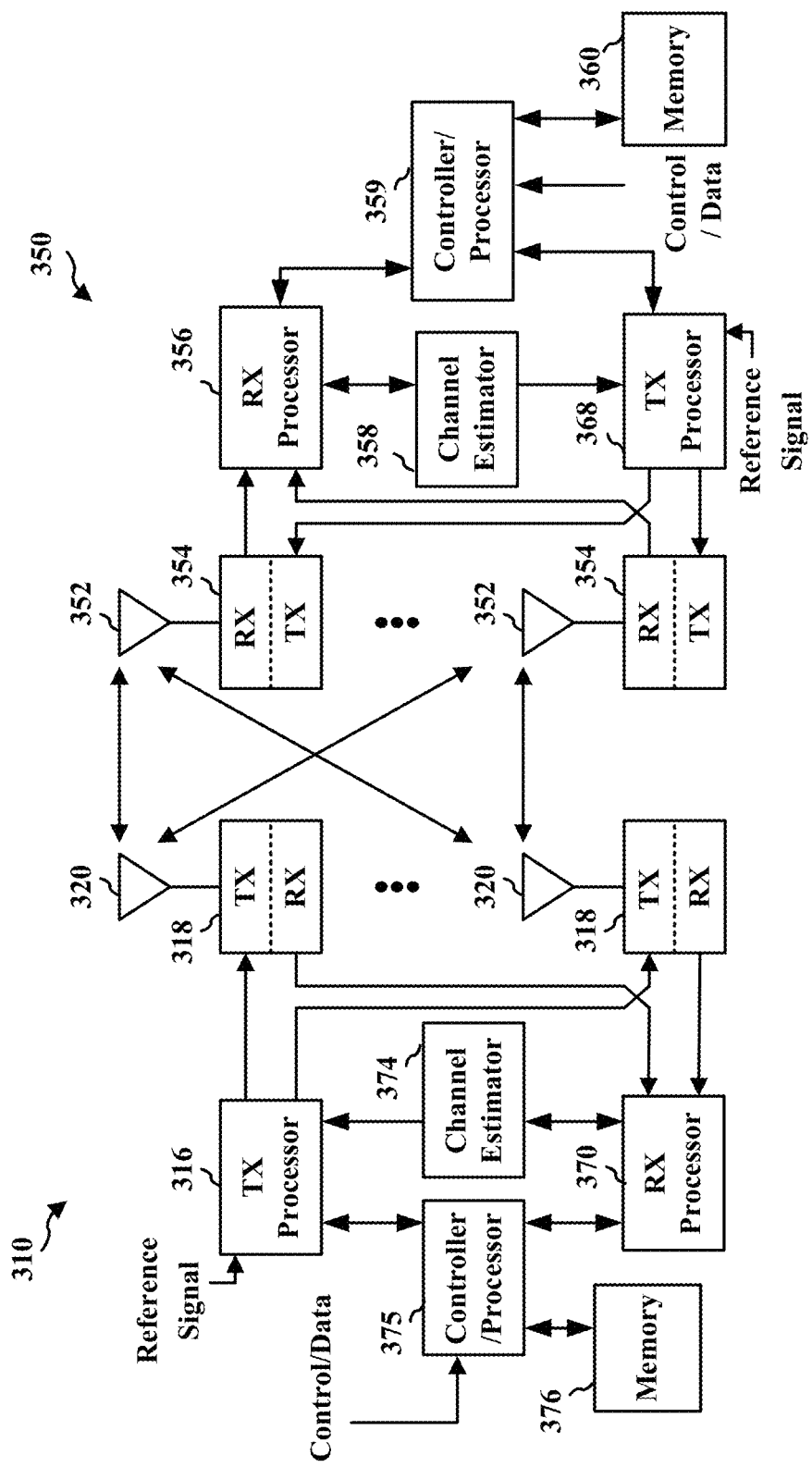
FIG. 3 is a diagram illustrating an example of a base station and user equipment UE in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the display-side antenna component 198 of FIG. 1. For example, the display-side antenna component 198 may include the antenna 352 and/or one or more components of the TX processor 368 and/or the RX processor 356, and/or may be coupled to the TX processor 368 and/or the RX processor 356 or components thereof.

Certain aspects above have been described with respect to a 5G device and/or system, or using nomenclature that may be associated with such device or system. It will be understood, however, that aspects described herein are not limited to use with 5G devices and/or systems. A device configured as described herein may communicate using one or more of any number of different types or standards or communications, for example including communications transmitted in a WLAN and/or WPAN. Further, while the term "millimeter wave" was described in certain examples with reference to frequencies defined pursuant to 5G NR, it will be understood that the definition of "millimeter wave" is not limited thereto.

FIG. 4A illustrates a top side perspective view of an example apparatus 400. FIG. 4B illustrates a bottom side perspective view of the example apparatus 400. Aspects of the apparatus 400 of FIGS. 4A and 4B may be implemented by a UE, such as the UE 104 and/or the UE 350. In the illustrated example of FIGS. 4A and 4B, the apparatus 400 is represented by a wireless communication device, such as a cellular phone or a smart phone.

In the illustrated example of FIGS. 4A and 4B, the apparatus 400 includes a housing 410, such as a top housing portion 410a, a bottom housing portion 410b, a near-side housing portion 410c, a far-side housing portion 410d, and a rear housing portion 410e. The example apparatus 400 also includes an example display device 420 that is supported by a front opening of the housing 410. As used herein, the term "housing" may refer to an external surface and/or an internal frame or support structure of the apparatus 400. It may be appreciated that each of the housing portions 410a, 410b, 410c, 410d, 410e may include an external side facing away from the center of the apparatus 400 and an opposite (or opposing) internal side that is facing toward the center of the apparatus 400. Furthermore, it may be appreciated that one or more of the housing portions 410a, 410b, 410c, 410d, 410e may support one or more additional components, such as one or more cameras, one or more speakers, one or more microphones, one or more user input interfaces (such as a volume button(s), a power button, etc.), and/or one or more power connectors.

To facilitate wireless communication, the apparatus 400 may include a plurality of antenna modules 430 that are supported by the housing 410 (e.g., a housing portion) and/or are positioned near the housing 410 (e.g., a housing portion). For example, the apparatus 400 includes a first antenna module 430a that is supported by and/or positioned near the top housing portion 410a. The apparatus 400 also includes a second antenna module 430b that is supported by and/or positioned near the near-side housing portion 410c. Additionally, the apparatus 400 includes a third antenna module 430c that is supported by and/or positioned near the far-side housing portion 410d.

The antenna modules 430 facilitate transmitting and/or receiving radio frequency (RF) signals at the apparatus 400. For example, the antenna modules 430 may include an array of one or more antennas (sometimes referred to as "antenna elements") to facilitate transmitting and/or receiving the RF signals over the air. The antenna modules 430 may also include a transceiver to process the received RF signals and/or to process data for transmitting as RF signals. In some examples, the antenna modules 430 provide directional radiation coverage for receiving and/or transmitting the RF signals (e.g., based on the positioning and alignment of the respective antennas). For example, the first antenna module 430a may provide directional radiation coverage along a positive y-axis from the top housing portion 410a, the second antenna module 430b may provide directional radiation coverage along a positive x-axis from the near-side housing portion 410b, and the third antenna module 430c may provide directional radiation coverage along a negative x-axis from the far-side housing portion 410d.

It may be appreciated that, as an antenna module occupies physical space of the apparatus, some example apparatus may not provide an antenna module supported by and/or positioned near the front of the apparatus 400 (e.g., in the same plane as the front opening of the housing 410) to, for example, increase the size of the visible area of the display device 420 (e.g., the portion of the display device 420 that is capable of presentment of graphical content). For example, the apparatus 400 of FIG. 4A does not include an antenna module that is supported by and/or positioned near the front opening of the housing 410.

By not placing an antenna module that is supported by and/or positioned near the front opening of the housing 410, it may be appreciated that the apparatus 400 may not provide sufficient directional radiation coverage along a positive z-axis. As a result, the transmitting and/or receiving of RF signals along the z-axis may be inefficient, resulting in a limited effective isotropic radiated power (EIRP) cumulative distribution function (CDF) that illustrates the overall radiation coverage of the apparatus.

In some examples, an apparatus may include an increased size of a bezel (or housing portion) to support an antenna module that provides directional radiation coverage along the positive z-axis. However, to maintain the same relative size of the visible area of the display device 420, such an approach may result in an increased overall size of the apparatus. Alternatively, the overall size of the apparatus may remain the same (e.g., relative to the example apparatus 400), but the size of the visible area of the display device 420 may decrease. In some examples, the display device 420 may include a cutout portion (e.g., a notch) that may support the antenna module, but such an approach may also result in the size of the visible area of the display device 420 decreasing.

Example techniques disclosed herein employ one or more antennas (e.g., mmW antennas) that are embedded in the display device of the apparatus. The one or more antennas may be configured as an antenna array. The antenna array may be printed onto an external surface of the display device using a conductive transparent materials, such as Indium Tin Oxide (ITO) or another transparent conductive oxide (TCO) or transparent conductive material. The conductive properties of the antenna array may enable the antennas of the antenna array to receive and/or transmit RF signals. The transparent properties of the antenna array may enable the antenna array to be positioned above a set of pixels of the display device (e.g., having a positive offset from the pixels in the z-axis) without the antenna array blocking presentment of graphical content via the set of pixels. The embedded antenna array may be positioned and aligned to provide directional radiation coverage along the z-axis (e.g., perpendicular to the external surface of the display device, for example in a positive direction along the z-axis). In some such examples, the EIRP CDF of the apparatus may increase as radiation coverage is extended into the z-axis, which may increase the overall spherical coverage of the apparatus.

Furthermore, to facilitate the processing of the RF signals for transmitting and/or receiving by the antenna array, disclosed techniques include an RF module that is positioned within the housing of the apparatus and under the display device. By placing the disclosed RF module under the display device, the RF module does not disrupt the presentment of graphical content by the display device. As a result, the size of the visible area of the disclosed apparatus may be similar to the size of the visible area of the apparatus 400 of FIGS. 4A and 4B, while also providing increased overall spherical coverage.

The RF module may incorporate RF components on a single substrate or structure, for example such that all components are included in a common package, and may be formed using any known manner. While several of the examples illustrate the RF module as a rectangular-shaped element such as a three-dimensional housing, other shapes or configurations are possible. The RF module may include an integrated circuit, or more than one such circuit, that processes the incoming or outgoing RF signal. Further, as noted herein, the module's functionality may be at least in part controlled by and/or otherwise in communication with a processor on the device. The module may further include one or more die, arranged adjacent one another or arranged in stacked form and packaged accordingly. In other examples, RF circuitry coupled to the antenna array is not packaged in a module. For example, the antenna array may be coupled to an RF IC that is coupled to a main board of the apparatus.

Example techniques disclosed herein also include a flex printed circuit (FPC) that operates as a conduit for RF signals between the antenna array and the RF module. In some examples, the FPC may be bonded to the display device and carry the RF signals between the antenna array and the RF module. For example, the FPC may include a first side that is connected to an antenna feed that extends from each antenna of the antenna array. The antenna feed may carry RF signals for transmission by the antenna array and/or carry RF signals that are received by the antenna array. In some examples, the antenna feed may be implemented by the same conductive transparent material as the antenna array.

In some examples, the FPC may include a second side that is connected to the RF module. In some examples, the second side of the FPC may be detachably coupled to the RF module. In the example including a standalone integrated circuit chip in place of the RF module, the FPC may be configured to include conductive traces that contact I/O pads of the antenna circuit. In other examples, the RF module may have a dedicated connector for use with the FPC. The connector may be interchangeable, such as a socket-based connector, or it may be permanent. In some examples, the second side of the FPC may be integrally coupled to the RF module. For example, the second side of the FPC may be an extension of the antenna module.

Figure 4:
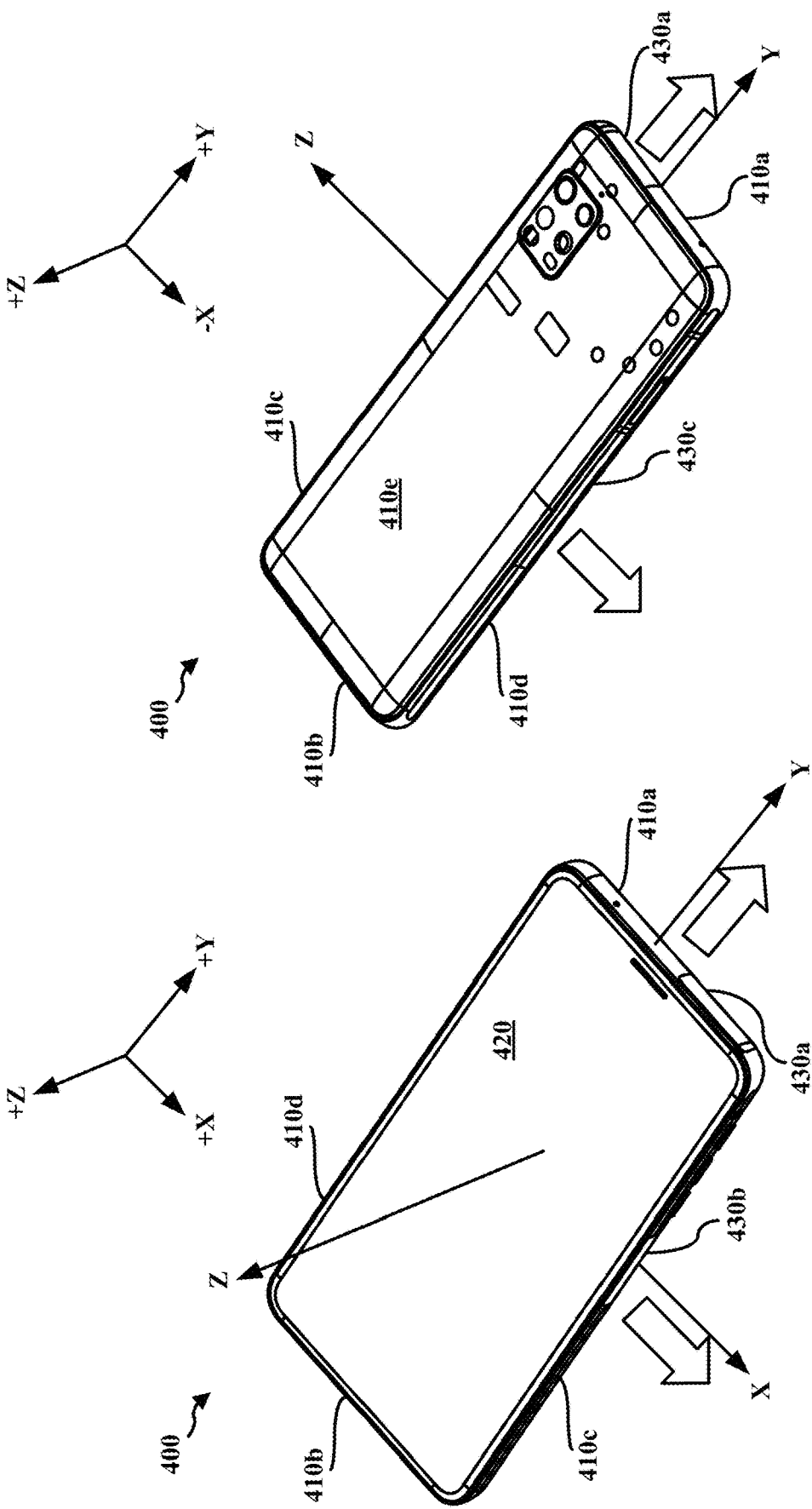
FIG. 4A illustrates a top side perspective view of an example apparatus.
FIG. 4B illustrates a bottom side perspective view of the example apparatus of FIG. 4A.
Figure 5:
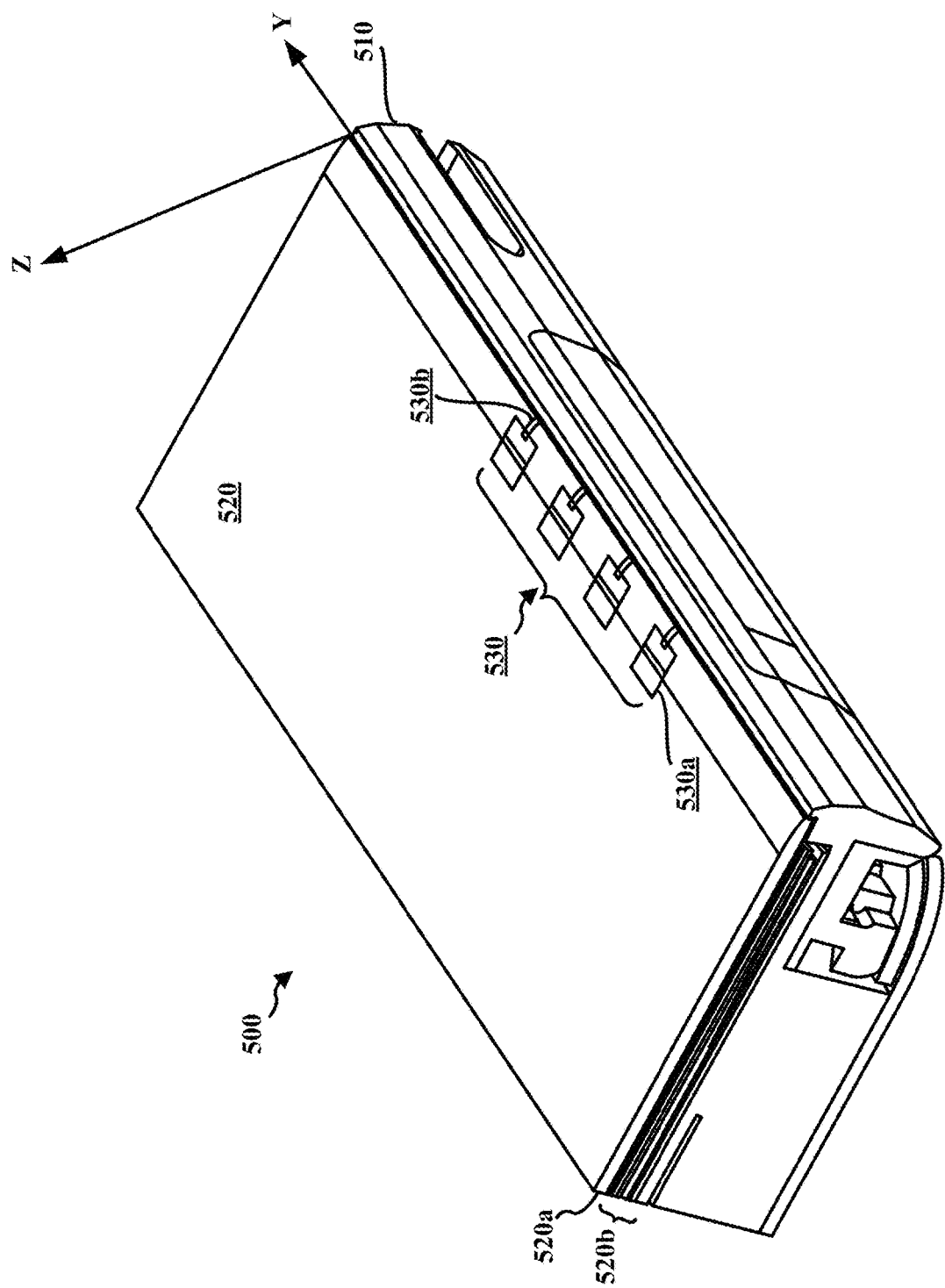
FIG. 5 illustrates a top side perspective view of a portion of an example apparatus, in accordance with one or more techniques disclosed herein.

FIG. 5 illustrates a top side perspective view of a portion of an example apparatus 500, in accordance with one or more techniques disclosed herein. Aspects of the apparatus 500 may be implemented by the UE 104, the UE 350, and/or the UE 400. In the illustrated example of FIG. 5, the apparatus 500 includes a housing, including example housing portion 510. The example apparatus 500 also includes a display device 520. Aspects of the housing portion 510 may be implemented by the housing 410 of FIGS. 4A and 4B, such as the near-side housing portion 410c of FIGS. 4A and 4B. Aspects of the display device 520 may be implemented by the display device 420 of FIGS. 4A and 4B.

In the illustrated example of FIG. 5, the display device 520 includes a glass cover 520a and a panel 520b. It should be noted that, while the term "glass cover" may be used to distinguish element 520 from other element of the display panel, in practice the cover 520a may alternatively be formed using any suitable transparent material including plastics, crystals, or other non-conductive transparent elements. Accordingly, for purposes of this disclosure, the reference to "glass cover" and similar terms identifying element 520a (and similar elements of other figures) is also intended to include within its scope covers made of a plastic, a laminate, or another suitable material.

The example panel 520b may be configured to facilitate presentment of graphical content. For example, the panel 520b may be configured to output graphical content via a plurality of pixels arranged within the panel 520b. In some examples, the graphical content output by the panel 520b may be presented via the glass cover 520a. In some examples, the panel 520b may include lighting components, pixel components, image processing components, and/or other components that may facilitate the presentment of graphical content via the display device 520.

In the illustrated example of FIG. 5, the apparatus 500 includes an antenna array 530 that is embedded in the display device 520 of the apparatus 500. For example, the antenna array 530 may be printed on an external surface of the glass cover 520a. In some examples, the antenna array 530 may be printed using a conductive transparent material, such as ITO. However, it may be appreciated that other examples may include additional or alternative conductive transparent material for implementing the antenna array 530. In addition, as noted above, in some examples various mesh elements may be used to construct the antenna array 530.

In the illustrated example, the antenna array 530 includes a 1×4 array of antennas 530a, such as mmW antenna elements. However, it may be appreciated that additional or alternative examples may include any suitable quantity and/or arrangement of antennas 530a. In some examples, the antenna array 530 may include an array of patch antennas. In some examples, the antenna array 530 may include an array of dipole antennas. The antennas 530a may facilitate transmitting and/or receiving RF signals. For example, the conductive properties of the antenna array (e.g., the ITO used to print the antenna array 530) may enable the antennas 530a to receive and/or transmit RF signals. As shown in the illustrated example of FIG. 5, the antennas 530a may overlap with the display device 520, including the glass cover 520a and the panel 520b, without blocking presentment of graphical content. For example, the transparent properties of the antenna array 530 may enable the antennas 530a to be positioned above a set of pixels of the panel 520b without the antennas 530a disturbing presentment of graphical content via the set of pixels.

In the illustrated example of FIG. 5, each antenna 530a of the antenna array 530 includes a respective antenna feed 530b. The antenna feed 530b may provide a transmission line for RF signals to and/or from the antennas 530a. In some examples, the antenna feed 530b may be implemented by the same conductive transparent material as the antenna array 530. In some examples, the antenna feed 530b may be an extension of the respective antennas 530a. In some examples, the antenna feed 530b may be fed through via(s) in the glass cover 520a.

It may be appreciated that by embedding the antenna array 530 with the display device 520 (e.g., by printing the antenna array 530 onto the external or internal surface of the glass cover 520a), the antennas 530a may be positioned and aligned to provide directional radiation coverage along the z-axis. In such examples, the EIRP CDF of the apparatus 500 may increase as radiation coverage is extended into the z-axis, which may increase the overall spherical coverage of the apparatus 500.

Furthermore, it may be appreciated that positioning the antenna array 530 onto the external or internal surface of the glass cover 520a may reduce and/or eliminate occurrences of hand blockage of signals. For example, as the antennas 530a are positioned along the external surface of the glass cover 520a and still provide presentment of graphical content, it is not likely that the antennas 530a would be covered-up or blocked by a hand during use of the apparatus 500.

As shown in FIG. 5, while the antennas 530a of the antenna array 530 overlap with the display device 520, including the glass cover 520a and the panel 520b, the antenna feeds 530b may extend from the antennas 530a towards the side of the apparatus 500 (e.g., towards the near-side housing portion 510).

Figure 6:
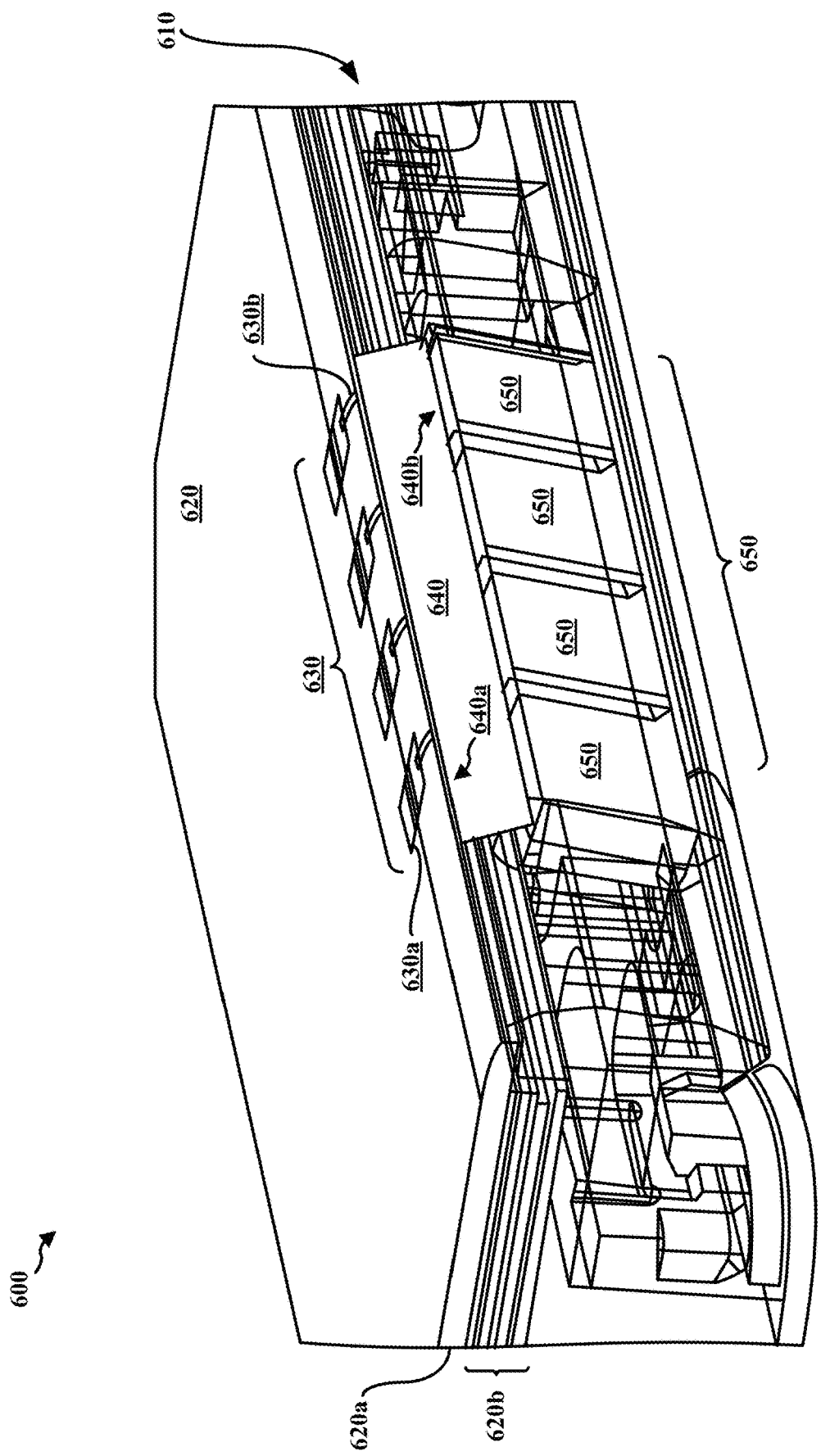
FIG. 6 illustrates a sectional view of a portion of an example apparatus, in accordance with one or more techniques disclosed herein.

FIG. 6 illustrates a sectional view of a portion of an example apparatus 600, in accordance with one or more techniques disclosed herein. Aspects of the apparatus 600 may be implemented by the UE 104, the UE 350, the apparatus 400, and/or the apparatus 500. In the illustrated example of FIG. 6, the apparatus 600 includes a housing, including example housing portion 610. The apparatus 600 also includes a display device 620 including an example glass cover 620a and a panel 620b. The apparatus 600 also includes an antenna array 630 including example antennas 630a and example antenna feed 630b. Aspects of the housing portion 610 may be implemented by the housing 410 of FIGS. 4A and 4B and/or the housing 510 of FIG. 5. Aspects of the display device 620 may be implemented by the display device 420 of FIGS. 4A and 4B and/or the display device 520 of FIG. 5, including the glass cover 520a and the panel 520b.

In the illustrated example of FIG. 6 (and as described above in connection with the antenna feed 530b of FIG. 5), the antenna feed 630b extends from the antennas 630a to a side of the apparatus 600 (e.g., towards the housing 610). An example flex printed circuit (FPC) 640 is positioned on the inside of the housing 610. The FPC 640 may be a printed circuit board that electrically connects electrical or electronic components using conductive tracks, pads, and/or other features.

In the illustrated example of FIG. 6, the FPC 640 operates to electrically connect the antenna array 630 to the antenna module 650. For example, in the illustrated example of FIG. 6, a first side 640a of the FPC 640 is connected to the antenna feed 630b, and a second side 640b of the FPC 640 is connected to the antenna module 650. The FPC 640 may, thus, carry the RF signals between the antenna array 630 and the antenna module 650. In some examples, the FPC 640 may be bonded to the glass cover 620a. For example, bonding the FPC 640 to the glass cover 620a may enable the first side 640a of the FPC 640 to connect to the antenna feed 630a. Although not shown in the illustrated example of FIG. 6, it may be appreciated that in some examples, the FPC 640 may include transmission lines that extend from the FPC 640 along the glass cover 620a to connect with the antenna feed 630b and/or may extend through one or more via(s) in the glass cover 620a to connect with the antenna feed 630b.

In the illustrated example of FIG. 6, the antenna module 650 is depicted as comprising a 1×4 array of antennas. However, in other examples, the antenna module 650 may include any suitable array of antennas. Furthermore, while the illustrated includes an antenna array 630 including a 1×4 array of antennas 630a and an antenna module 650 including a 1×4 array of antennas, it may be appreciated that in other examples, the array associated with the antenna array 630 may be different than the array associated with the antenna module 650.

The antenna module 650 may be an example of the RF module described above. In some embodiments, an RF module that does not include any antennas may be used instead of the antenna module 650.

In the illustrated example of FIG. 6, the antenna module 650 facilitates the processing of RF signals for transmitting and/or receiving by the antenna array 630. In some examples, each antenna 630a of the antenna array 630 may be associated with a respective antenna of the antenna module 650. In some examples, the example antenna module 650 may include a transceiver. In some examples, the antenna module 650 may be controlled by and/or otherwise in communication with a processing unit of the apparatus 600. In some such examples, the second side 640b of the FPC 640 may be configured to receive signals based on instructions from the processing unit of the apparatus 600. In some examples in which the antenna module 650 is omitted and a standalone integrated circuit chip is used instead, the second side 640b of the FPC 640 may be connected to a printed circuit board or interface of the standalone IC.

As shown in FIG. 6, the antenna module 650 is positioned inside the housing 610 and below the display device 620. Accordingly, it may be appreciated that the antenna module 650 may be positioned to further avoid blocking presentment of graphical content via the display device 620.

Figure 7:
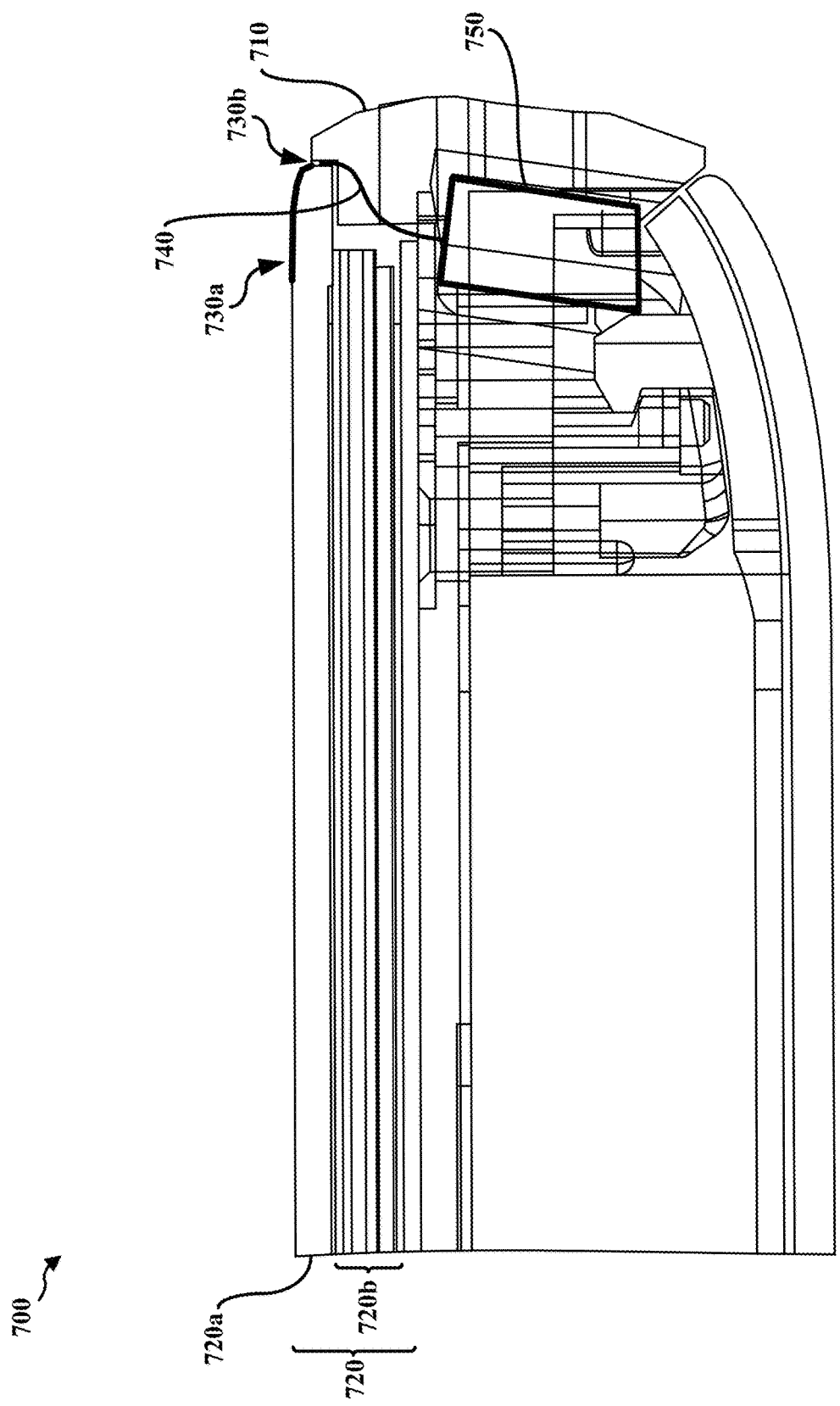
FIG. 7 illustrates a sectional side view of a portion of an example apparatus, in accordance with one or more techniques disclosed herein.

FIG. 7 illustrates a sectional side view of a portion of an example apparatus 700, in accordance with one or more techniques disclosed herein. Aspects of the apparatus 700 may be implemented by the UE 104, the UE 350, the apparatus 400, the apparatus 500, and/or the apparatus 600. In the illustrated example of FIG. 7, the apparatus 700 includes a housing, including example housing portion 710. The apparatus 700 also includes a display device 720 including an example glass cover 720*a* and a panel 720*b*. The apparatus 700 also includes an antenna array 730 including example antennas 730*a* and example antenna feed 730*b*. The example apparatus 700 also includes an FPC 740 and an RF module 750. In the illustrated example, a first side of the FPC 740 is connected to the antenna feed 730*b*, and a second side of the FPC 740 is connected to the RF module 750.

Aspects of the housing portion 710 may be implemented by the housing 410 of FIGS. 4A and 4B, the housing 510 of FIG. 5, and/or the housing 610 of FIG. 6. Aspects of the display device 720 may be implemented by the display device 420 of FIGS. 4A and 4B, the display device 520 of FIG. 5, including the glass cover 520*a* and the panel 520*b*, and/or the display device 620 of FIG. 6, including the glass cover 620*a* and the panel 620*b*. Aspects of the FPC 740 may be implemented by the FPC 640 of FIG. 6. Aspects of the RF module 750 may be implemented by the RF modules discussed above, the antenna modules 430 of FIGS. 4A and 4B, and/or the antenna module 650 of FIG. 6. In other embodiments, a standalone IC may be used instead of the RF module 750.

As shown in FIG. 7, the RF module 750 is supported by an inner surface of the housing 710. However, it may be appreciated that in other additional or alternative examples, the RF module 750 may be positioned differently, such as positioned near the inner surface of the housing 710 without being supported by the inner surface of the housing 710. The RF module 750 of FIG. 7 is also positioned within the housing 710 of the apparatus 700 and below the display device 720. For example, the panel 720*b* of the display device 720 is positioned between the glass cover 720*a* and the RF module 750.

In the illustrated example of FIG. 7, the antenna feed 730*b* extends out from the antenna 730*a* and extends to an edge of the glass cover 720*a*. The antenna feed 730*b* then connects to the FPC 740 at a first side of the FPC 740.

In the illustrated example of FIG. 7, the edge of the glass cover 720*a* extends to an inner surface of the housing 710. In such examples, the FPC 740 may be positioned between the edge of the glass cover 720*a* and the inner surface of the housing 710, or the antenna feed 730*b* may wrap around the edge of the glass cover 720*a* and couple to the FPC 740 at an underside of the glass cover 720*a*.

In some examples, the display device 720 may be configured as a "waterfall display." For example, the glass cover 720*a* may be curved and extend past the housing 710 so that the housing 710 is not visible when the apparatus 700 is viewed from above the display device 720. In such examples, the antenna feed 730*b* may extend to the edge of the curved glass cover 720*a* and the FPC 740 may be positioned under the glass cover 720*a*, but still connected to the antenna feed 730*b*.

As described above, the antenna array 730 may be printed on the external surface of the glass cover 720*a* and the FPC 740 may be bonded with the glass cover 720*a*. In some examples, the second side of the FPC 740 may be detachably connected to the RF module 750. In some such examples, when removing the display device 720, the FPC 740 may be detached from the RF module 750 so that the antenna array 730 and the FPC 740 are also removed while the RF module 750 remains within the housing 710 of the apparatus 700.

In some examples, the second side of the FPC 740 may be integrally connected with the RF module 750. In some such examples, removing the display device 720 may also include removing the antenna array 730, the FPC 740, and the RF module 750.

Figure 8:
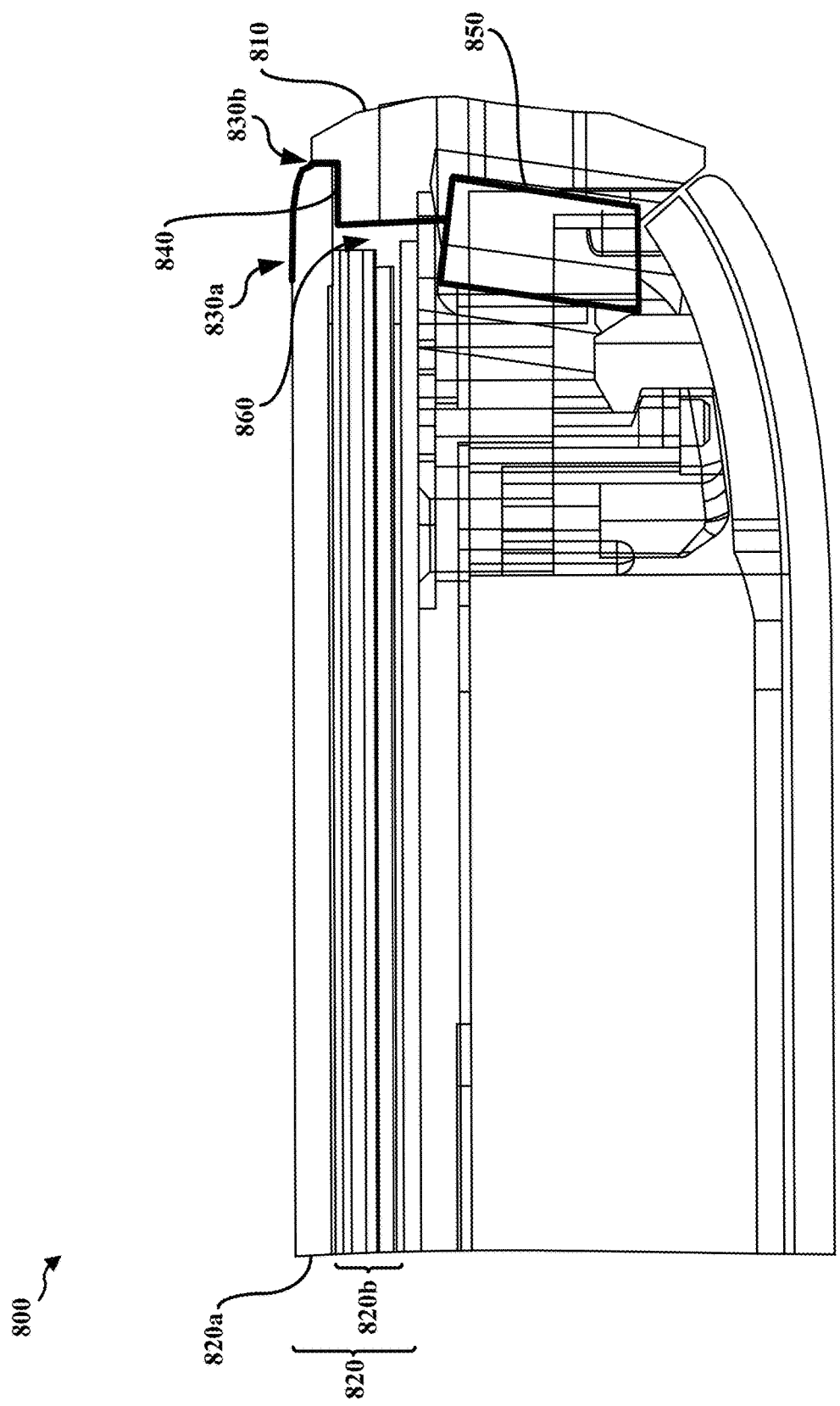
FIG. 8 illustrates a sectional side view of a portion of another example apparatus, in accordance with one or more techniques disclosed herein.

FIG. 8 illustrates a sectional side view of a portion of an example apparatus 800, in accordance with one or more techniques disclosed herein. Aspects of the apparatus 800 may be implemented by the UE 104, the UE 350, the apparatus 400, the apparatus 500, the apparatus 600, and/or the apparatus 700. In the illustrated example of FIG. 8, the apparatus 800 includes a housing, including example housing portion 810. The apparatus 800 also includes a display device 820 including an example glass cover 820*a* and a panel 820*b*. The apparatus 800 also includes an antenna array 830 including example antennas 830*a* and example antenna feed 830*b*. The example apparatus 800 also includes an FPC 840 and an RF module 850. In the illustrated example, a first side of the FPC 840 is connected to the antenna feed 830*b*, and a second side of the FPC 840 is connected to the RF module 850.

Aspects of the housing portion 810 may be implemented by the housing 410 of FIGS. 4A and 4B, the housing 510 of FIG. 5, the housing 610 of FIG. 6, and/or the housing 710 of FIG. 7. Aspects of the display device 820 may be implemented by the display device 420 of FIGS. 4A and 4B, the display device 520 of FIG. 5, including the glass cover 520*a* and the panel 520*b*, the display device 620 of FIG. 6, including the glass cover 620*a* and the panel 620*b*, and/or the display device 720 of FIG. 7, including the glass cover 720*a* and the panel 720*b*. Aspects of the FPC 840 may be implemented by the FPC 640 of FIG. 6 and/or the FPC 740 of FIG. 7. Aspects of the RF module 850 may be implemented by the RF modules described above, the antenna modules 430 of FIGS. 4A and 4B, the antenna module 650 of FIG. 6, and/or the RF module 750 of FIG. 7. In other embodiments, a standalone IC may be used instead of the RF module 850.

Similar to the illustrated example of FIG. 7, the RF module 850 of FIG. 8 is supported by an inner surface of the housing 810. However, it may be appreciated that in other additional or alternative examples, the RF module 850 may be positioned differently, such as positioned near the inner surface of the housing 810 without being supported by the inner surface of the housing 810. The RF module 850 of FIG. 8 is also positioned within the housing 810 of the apparatus 800 and below the display device 820.

In the illustrated example of FIG. 8, the antenna feed 830*b* extends out from the antenna 830*a* and extends to an edge of the glass cover 820*a*. Similar to the illustrated example of FIG. 7, the antenna feed 830*b* then connects to the FPC 840 at a first side of the FPC 840. In the illustrated example of FIG. 8, the FPC 840 is positioned in a gap 860 between the glass cover 820 and the housing 810. For example, the FPC 840 may be bonded to an internal surface of the glass cover 820*a*. In some such examples, the FPC 840 may be positioned to be sitting relatively flat against the internal surface of the glass cover 820*a* instead of wrapping around the edge of the glass cover 820*a* (as shown in the illustrated example of FIG. 7). In other examples, the feed 830*b* wraps around the glass cover 820*a*, runs along an underside of the glass cover 820*a*, and connects to the FPC 840 in the gap 860.

Figure 9:
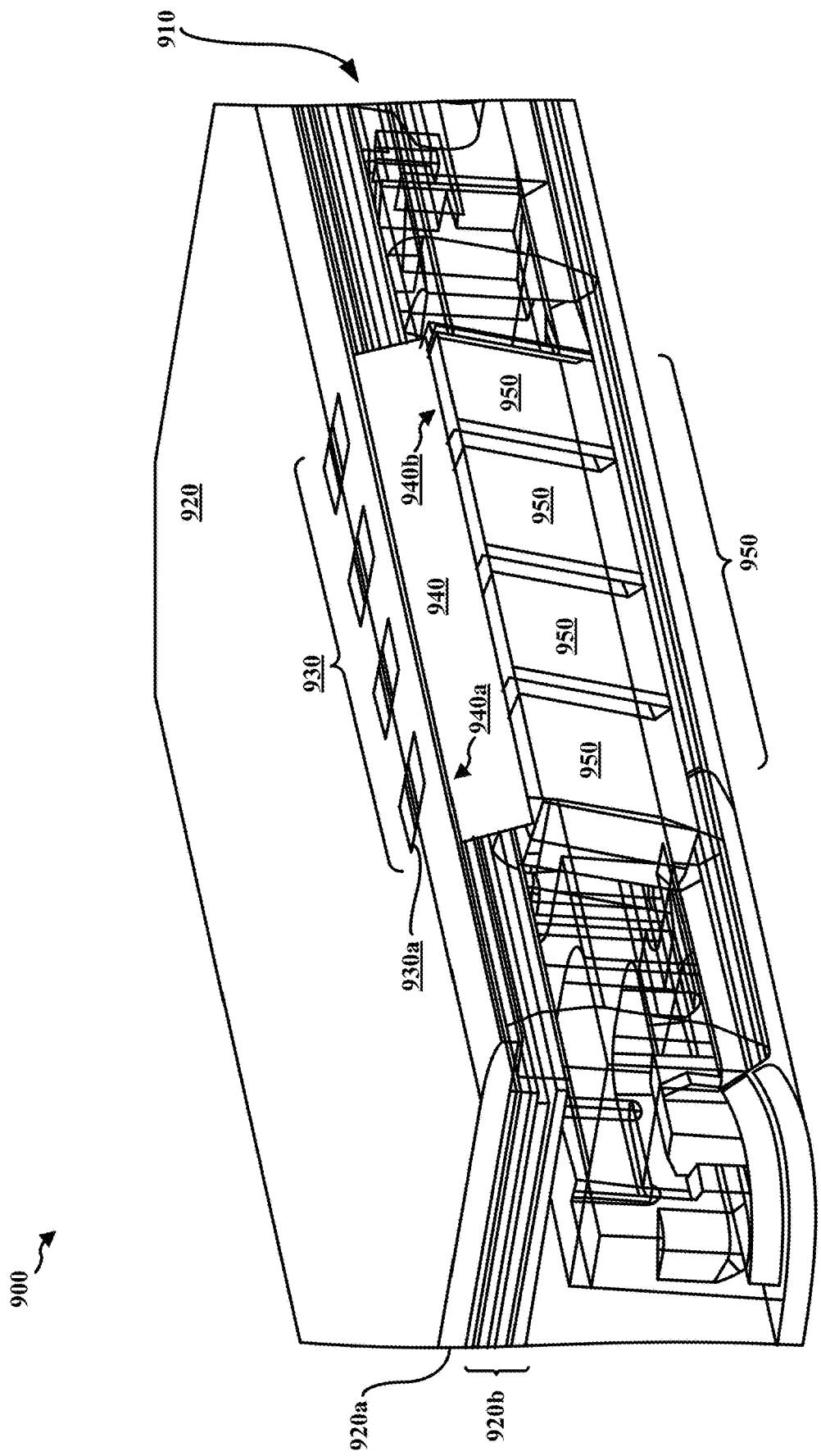
FIG. 9 illustrates a sectional view of a portion of another example apparatus, in accordance with one or more techniques disclosed herein.
Figure 10:
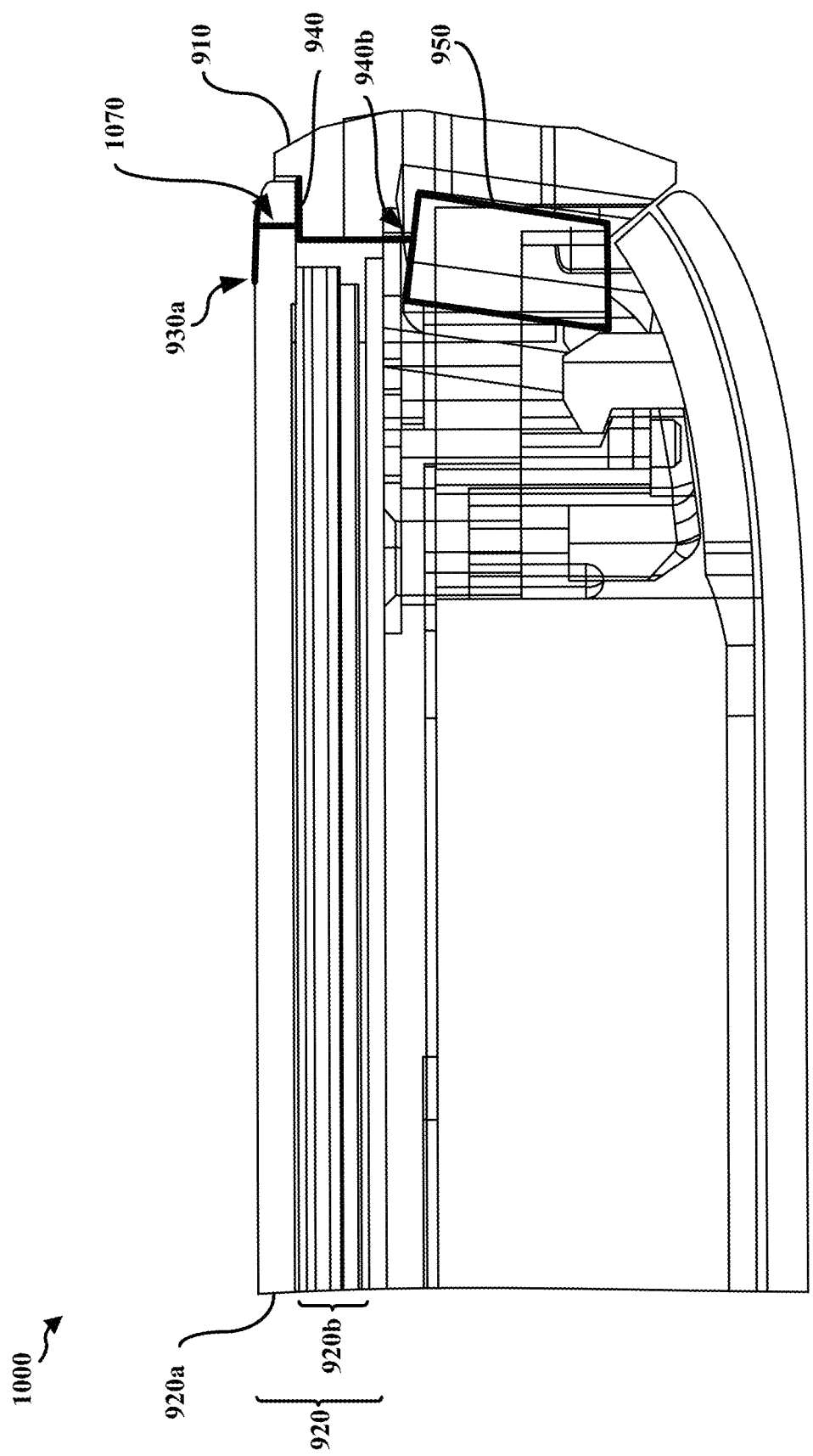
FIG. 10 illustrates a sectional side view of a portion of another example apparatus, in accordance with one or more techniques disclosed herein.

FIG. 9 illustrates a sectional view of a portion of an example apparatus 900, in accordance with one or more techniques disclosed herein. FIG. 10 illustrates a sectional side view of a portion of the example apparatus 900 of FIG. 9, in accordance with one or more techniques disclosed herein. Aspects of the apparatus 900 of FIGS. 9 and/or 10 may be implemented by the UE 104, the UE 350, the apparatus 400, the apparatus 500, the apparatus 600, the apparatus 700, and/or the apparatus 800. In the illustrated examples of FIGS. 9 and 10, the apparatus 900 includes a housing, including example housing portion 910. The apparatus 900 also includes a display device 920 including an example glass cover 920a and a panel 920b. The apparatus 900 also includes an antenna array 930 including example antennas 930a. The example apparatus 900 also includes an FPC 940 and an antenna module 950. In the illustrated example, a second side 940b of the FPC 940 is connected to the antenna module 950.

Aspects of the housing portion 910 of FIGS. 9 and 10 may be implemented by the housing 410 of FIGS. 4A and 4B, the housing 510 of FIG. 5, the housing 610 of FIG. 6, the housing 710 of FIG. 7, and/or the housing portion 810 of FIG. 8. Aspects of the display device 920 may be implemented by the display device 420 of FIGS. 4A and 4B, the display device 520 of FIG. 5, including the glass cover 520a and the panel 520b, the display device 620 of FIG. 6, including the glass cover 620a and the panel 620b, the display device 720 of FIG. 7, including the glass cover 720a and the panel 720b, and/or the display device 820 of FIG. 8, including the glass cover 820a and the panel 820b. Aspects of the FPC 940 may be implemented by the FPC 640 of FIG. 6, the FPC 740 of FIG. 7, and/or the FPC 840 of FIG. 8. Aspects of the antenna module 950 may be implemented by the RF modules described above, the antenna modules 430 of FIGS. 4A and 4B, the antenna module 650 of FIG. 6, the RF module 750 of FIG. 7, and/or the RF module 850 of FIG. 8. While the antenna module 950 is illustrated as including an array of antennas, it will be understood that an RF module omitting antennas or a standalone IC may be used instead.

In the illustrated examples of FIGS. 9 and 10, the antennas 930a of the antenna array 930 are printed onto an external surface of the glass cover 920a. In some examples, the glass cover 920a includes one or more via(s) 1070 that may extend from the external surface of the glass cover 920a to the internal surface of the glass cover 920a and through the glass cover 920a. In some examples, an antenna feed extending from an antenna 930a may extend into the via 1070 and connect with the FPC 940. In some examples, the FPC 940 may include a transmission line that extends out from the FPC 940, through the via 1070, and directly contacts the antenna 930a. In some examples, an antenna feed may extend from an antenna 930a into the via 1070 and the FPC 940 may include a transmission line that extends out from the FPC 940 and contacts the antenna feed in the via 1070. In some such examples, the antenna 930a and the FPC 940 may be in contact using capacitive coupling (e.g., at the via(s) 1070) or using a slot coupled connection (e.g., at the via(s) 1070).

As shown in FIG. 10, the via(s) 1070 may be positioned at the glass cover 920a so that they do not overlap with the panel 920b of the display device 920. Accordingly, the antennas 930a, the via(s) 1070, the FPC 940, and the antenna module 950 are positioned so that blocking presentment of graphical content via the display device 920 may be avoided.

As described above, the antennas (e.g., 530a, 630a, 730a, 830a, 930a) of the preceding examples may be configured in any number of different ways to include different shapes, size, types, and/or materials. For example, the antenna elements in any of the previous example FIGS. 5-10 may include mesh elements as described below.

Figure 11:
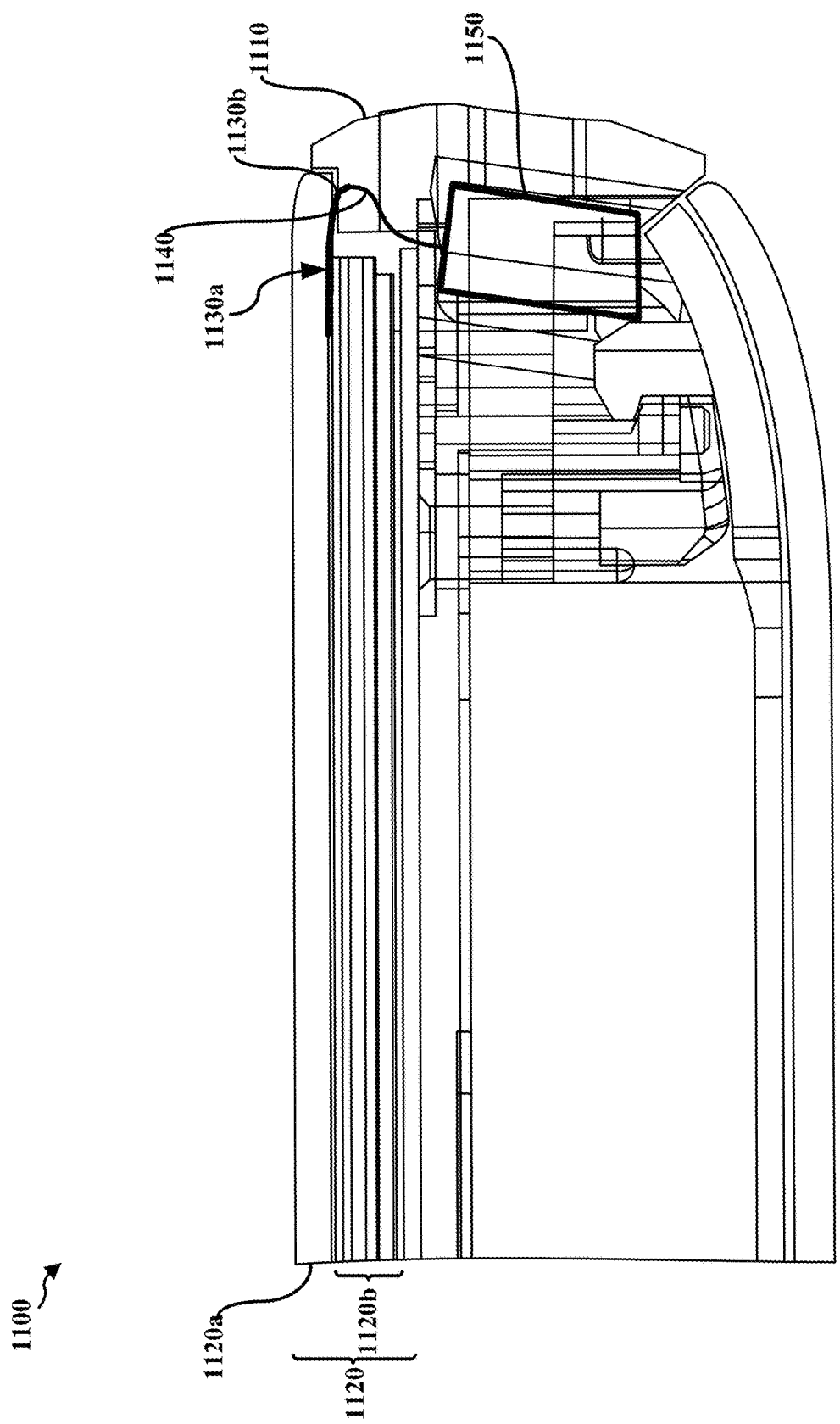
FIG. 11 illustrates a sectional side view of a portion of another example apparatus, in accordance with one or more techniques disclosed herein.

FIG. 11 illustrates a sectional side view of a portion of another example apparatus, in accordance with one or more techniques disclosed herein. Aspects of the apparatus 1100 may be implemented by the UE 104, the UE 350, the apparatus 400, the apparatus 500, the apparatus 600, the apparatus 700, and/or the apparatus 900. In the illustrated example of FIG. 11, the apparatus 1100 includes a housing, including example housing portion 1110. The apparatus 1100 also includes a display device 1120 including an example glass cover 1120a (which, as noted, can include plastics and other suitable transparent materials) and a panel 1120b. The apparatus 1100 also includes an antenna array 1130 including example antennas 1130a and example antenna feed 1130b. The example apparatus 1100 also includes an FPC 1140 and an RF module 1150. The RF module 1150 may include any suitable module, package or die(s) that include(s) the necessary circuits for processing the incoming and outgoing signal from and to antennas 1130a. In the illustrated example, a first side of the FPC 1140 is connected to the antenna feed 1130b, and a second side of the FPC 1140 is connected to the RF module 1150.

Aspects of the housing portion 1110 may be implemented by the housing 410 of FIGS. 4A and 4B, the housing 510 of FIG. 5, the housing 610 of FIG. 6, and/or the housing 710 of FIG. 7. Aspects of the display device 1120 may be implemented by the display device 420 of FIGS. 4A and 4B, the display device 520 of FIG. 5, including the glass cover 520a and the panel 520b, the display device 620 of FIG. 6, including the glass cover 620a and the panel 620b, and/or the display device 720 of FIG. 7, including the glass cover 720a and the panel 720b. Aspects of the FPC 1140 may be implemented by the FPC 640 of FIG. 6 and/or the FPC 740 of FIG. 7. Aspects of the RF module 1150 may be implemented by the RF modules described above, the antenna modules 430 of FIGS. 4A and 4B, the antenna module 650 of FIG. 6, the RF module 750 of FIG. 7, and/or the RF module 850 of FIG. 8. In other embodiments, a standalone IC may be used instead of the RF module 1150.

Similar to the illustrated example of FIG. 7, the RF module 1150 of FIG. 11 is supported by an inner surface of the housing 1110. However, it may be appreciated that in other additional or alternative examples, the RF module 1150 may be positioned differently, such as positioned near the inner surface of the housing 1110 without being supported by the inner surface of the housing 1110. The RF module 1150 of FIG. 11 is also positioned within the housing 1110 of the apparatus 1100 and below the display device 1120.

In this example the antenna feed is maintained within the housing and extends for a smaller length to the antenna 1130a. One side of the antenna feed 1130b then connects to the FPC 1140 at a first side of the FPC 1140. The RF module 1150 may be bound to a solid portion of the housing, or if a standalone integrated circuit is used, it may be positioned on a printed circuit board, or a plurality of adjacent or stacked printed circuit boards.

Unlike the previous illustrations, the antenna 1130a in this example is formed on an inner surface of the glass cover. For example, in an embodiment, the antenna is 3D printed on an internal portion of the cover before the cover is placed within the housing. In other examples, the antenna 1130a is formed over the surface using a laminate technique. In some examples, a small portion of the inside of the glass cover 1120a may be sanded or machined away to create space for the antenna(s) 1130a to be formed within the internal surface of the cover 1120a. The antenna 1130a may be formed at an edge of the device. In examples described above, the glass cover 1130a is herein construed to include glass or another transparent material such as certain types of plastics or ceramics. As above, the antenna elements 1130a may include a conductive TCO. Alternatively, the antenna may be composed of a mesh configuration.

Figure 12:
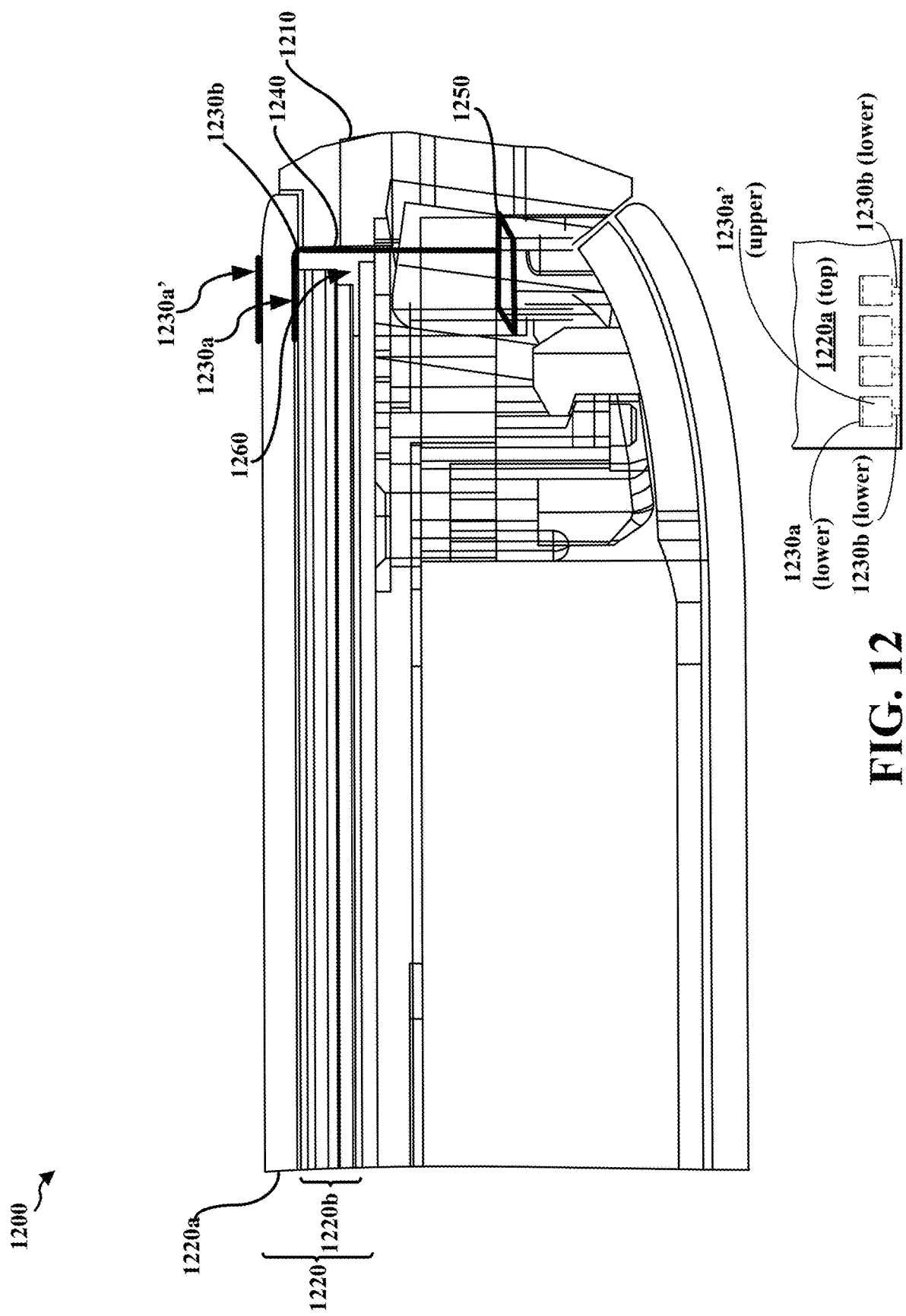
FIG. 12 illustrates a sectional side view of a portion of another example apparatus, in accordance with one or more techniques disclosed herein.

FIG. 12 illustrates a sectional side view of a portion of another example apparatus, in accordance with one or more techniques disclosed herein. As described with respect to previous examples, the device may include a housing, an exemplary portion of which is shown by element 1210. The device may also include a panel 1220 including cover 1220a and display element 1120b. In this example, the antenna-related circuits are positioned in a gap 1260 in the device adjacent an edge of the housing 1210.

In the example shown, an integrated circuit 1250 is positioned such that it is bonded or firmly placed in the available gap 1260, and may include elements for processing the incoming and outgoing signal from and to antennas 1230a. In other examples, an RF module may be mounted inside the housing 1210 instead of the integrated circuit 1250. The FPC 1240 is coupled to the integrated circuit 1250 using suitable routing, such as through a dedicated connector or using connective elements bonded to I/O pads of an integrated circuit. FPC 1240 is provided to an antenna feed 1230b near the internal surface of cover 1220a. The antennas 1230a are formed on the internal surface of the cover 1220a. The antennas 1230a may be transparent conductive elements or a mesh geometry of copper, silver or other metals. In addition, the example of FIG. 12 further includes a separate patch antenna element 1230a' formed on an external surface of cover 1220a (or embedded within the cover 1220a, which isn't illustrated). The antenna element 1230a' in this example is isolated electrically and may increase the bandwidth and efficiency of antennas in the array 1230. For example, the antenna element 1230a' may be parasitically coupled to the antenna 1230a. In other configurations, antenna element 1230a' may include its own antenna feed (not shown, for example which may be driven at a different frequency as compared to the antenna 1230a) for connection to the FPC 1240 or another FPC, and/or to the IC 1250 or another IC or an RF module.

As shown in the top view of a small exemplary region of cover 1220a located near an edge of the housing 1210, the lower antenna elements 1230a on the internal surface of the cover 1220a are shown, as well as the portion of antenna feeds 1230b. Also, the upper isolated antenna elements 1230a' on the external surface of the cover 1220a are shown, and are slightly offset in the illustration for the purpose of differentiating the two in the drawing. It will be understood, however, that the antennas 1230a and the antenna elements 1230a' may be aligned. In other examples, the floated antenna elements 1230a' may be staggered or offset from the lower antenna elements 1230a. Further, the geometry, including the shape(s) and size(s) of the floated antenna elements 1230a' may in some examples be different from the geometry of antenna elements 1230, and like the antenna elements 1230a, the respective elements 1230a' can take on any suitable shape, for example to maximize signal bandwidth and antenna efficiency.

Figure 13:
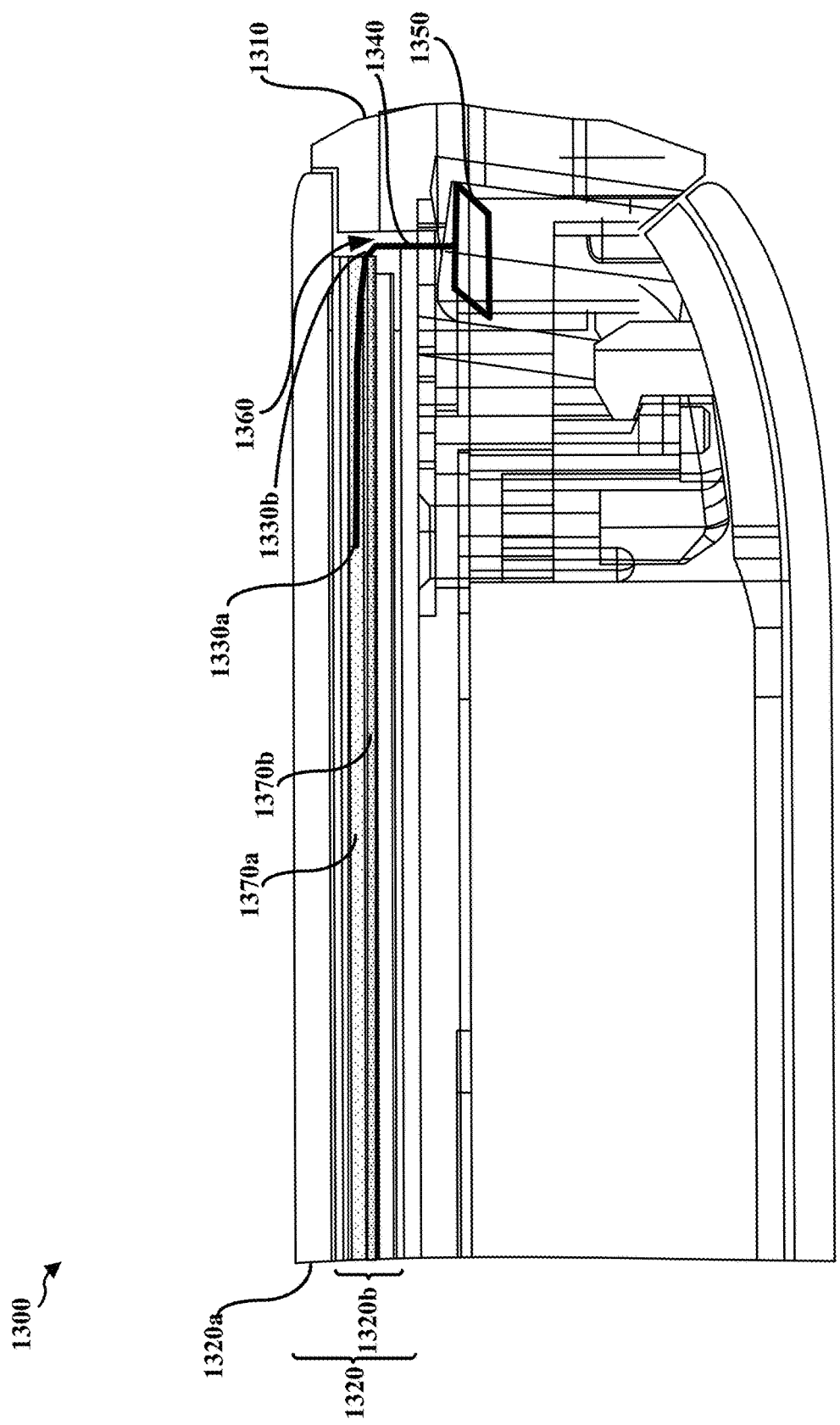
FIG. 13 illustrates a sectional side view of a portion of another example apparatus, in accordance with one or more techniques disclosed herein.

FIG. 13 illustrates a sectional side view of a portion of another example apparatus, in accordance with one or more techniques disclosed herein. The apparatus of FIG. 13 includes similar elements to those embodiments above, including display 1320, glass/plastic cover 1320a, and display element or panel 1320b. A gap 1360 is present in which antenna feed 1330b extends to FPC 1340, which in this example is coupled to RF module 1350, where the module is a circuit in a flat package or another shaped package; a standalone IC or a plurality of circuits disposed on a printed circuit board may be used instead.

In this example, the antennas 1330a are sandwiched within display panel 1320b in a manner that does not significantly interfere with operation of the pixels and the functions of the display. In the example shown, the antennas 1330a are made larger (for example, in comparison to antennas in previous examples configured to communicate in the same frequencies) to compensate for their position in the display panel closer to metal surfaces, which for example may form a ground plane for the antennas. To provide additional separation from the power and/or ground planes of the display device, antennas 1330a may be sandwiched between a separate transparent layer of padding 1370a (e.g., an adhesive, ceramic, plastic, glass, foam etc.) that provides both electrical isolation for the antenna signal and additional physical separation from the electrode plates or ground elements of the display. In some examples, the antennas 1330a are disposed between the padding layer 1370a and the display glass 1320a. Alternatively, or in addition, separate transparent physical layers 1370b may be included. In some examples, the antennas 1330a may rest directly on the additional physical layer 1370b, which may provide separation from the ground plane of the display. The size and/or number of antennas may be increased as necessary to provide greater reception and transmission capability.

In further examples, antennas 1330a may be arranged within the same layer as the touch pad formed within the display device. The touch sensor can be integrated with the antennas to provide separation from electrical contact while still enabling the device to receive tactile input. As one example, both the antenna elements and the touch sensor may be composed of one of the transparent conducting oxides (TCOs), and thus they can perform dual functions of providing a touch sensor layer as well as transparency to the user of the device in the affected regions. In some embodiments, an element in the touch sensor layer is coupled both to sensor circuitry and to RF communication in order to allow the element to function as both a touch sensor and an antenna. In other embodiments, the (e.g., electrodes of the) touch sensors and the antennas are separate elements, but are formed on the same layer. In such embodiments, the antennas and touch sensors may be interleaved, or the antennas may be formed in an area outside a portion of the display element 1320 configured to sense touch.

An advantage of this configuration is that the touch sensor is an existing layer in the display. Rather than create a new layer, in some examples the antennas can be etched directly within the touch sensor. For example, the areas near the edge of the array which may be less likely to receive common tactile input may be used both for touch input and for antenna space. The touch sensor in some exemplary devices may sit above one of the metal conducting plates of the transparent display (with an insulating separation layer included therebetween). With sufficient electrical separation from the conducting plates, the antenna can be placed within the display panel using any of these methods, or a combination thereof.

Figure 14:
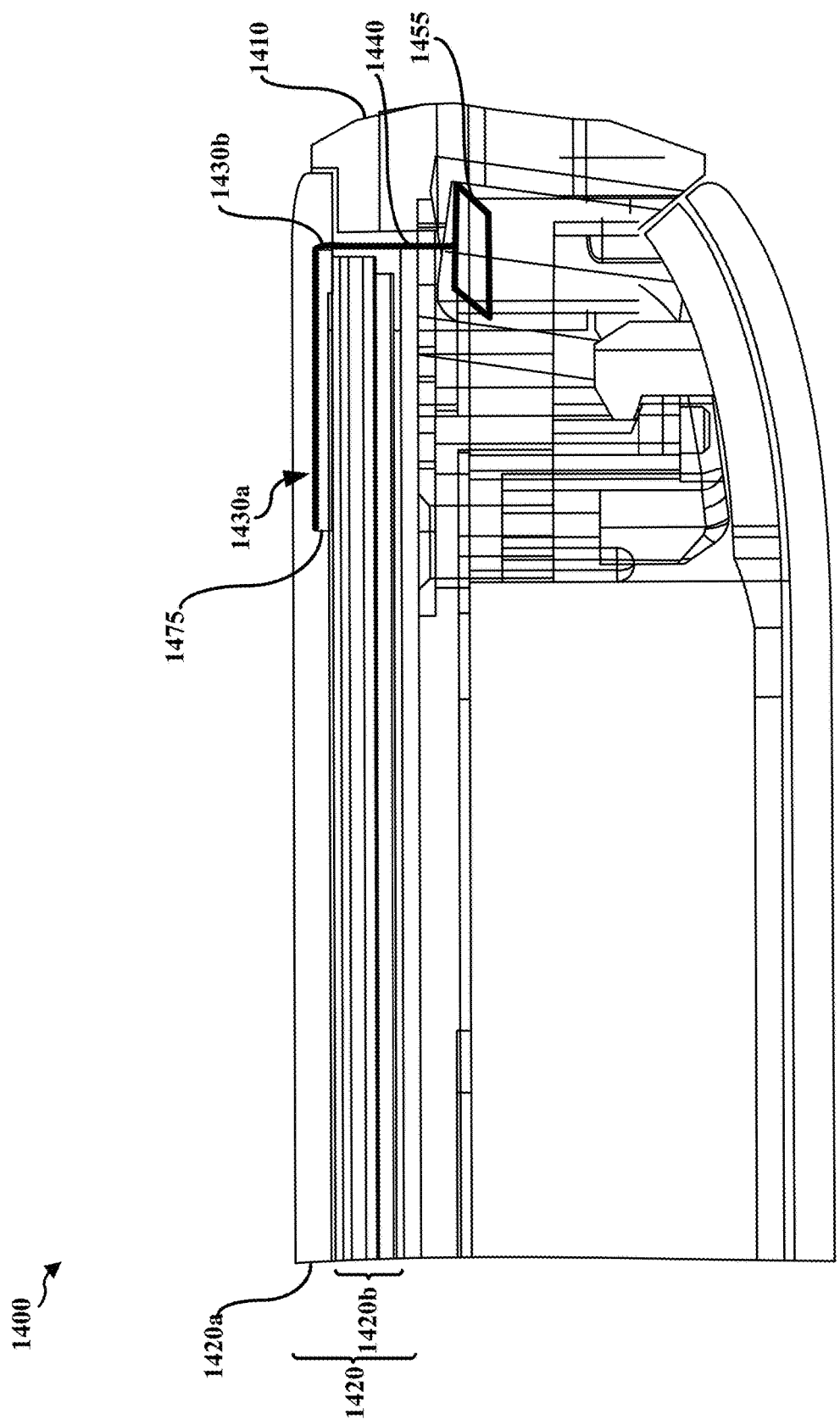
FIG. 14 illustrates a sectional side view of a portion of another example apparatus, in accordance with one or more techniques disclosed herein.

FIG. 14 illustrates a sectional side view of a portion of another example apparatus, in accordance with one or more techniques disclosed herein. FIG. 14 includes housing portion 1410, display 1420 having glass cover 1420a and display element or panel 1420b. Antenna circuit 1455 includes an integrated circuit or other device as described herein, or may be replaced with an RF module. FPC 1440 may be vertically routed up from a connector to the antenna circuit 1455, with antenna feed 1430*b* curving from a vertical position to a horizontal position to meet the antennas 1430*a*. In this embodiment, the antennas are formed within the glass cover 1420*a* (which, as noted, may encompass plastic or other suitable materials). In the example shown, antennas 1430*a* are printed or otherwise formed within the cover 1420*a* during manufacturing. Thereafter, a matching rectangular chunk 1475 of glass, plastic, etc., may be inserted and bonded via an adhesive to secure the antennas 1430*a*. In some embodiments, the antennas 1430*a* may be positioned within the cover 1420 via a laminate, and the chunk 1475 may be omitted, for example because a layer below the antennas 1430*a* is integrally formed. In other examples, the antennas may be formed on the external surface of cover 1420*a*.

While the antennas in the previous figures have undertaken certain geometric shapes, sizes and geometries may be modified for the anticipated applications.

The antennas in any of the following FIGS. 5-14 may in various configurations be manufactured using TCOs. In other examples, the antennas may use a mesh geometry or configuration. Mesh configurations can be composed of copper, silver aluminum, or any other non-transparent alloy. Thus, the mesh need not be a TCO. However, the mesh configuration can be implemented such that the mesh filaments or fine lines are thin enough such that the display pixels underneath the mesh are still visible to the human eye, with sufficient spacing between mesh portions to help ensure the quality of the display is not compromised. Implementing the antenna arrays herein using a mesh configuration may be beneficial because of the larger number of manufacturing options available for non-transparent metals. For example, high speed printing, electroplating, and other deposition techniques may lower the cost. Mesh may also have greater stability at different optical wavelengths, which makes it a useful configuration. While the lower surface area of material in the meshes may increase resistance, manufacturers can use higher-conductivity metals to give the antennas very high transmittances, making the antennas beneficial for use in the applications described herein.

FIGS. 15A and 15B illustrate top views 1500*a* and 1500*b* of example antenna elements, in accordance with one or more techniques disclosed herein. The mesh geometries of FIGS. 15A and 15B are but two of many different configurations. The use of large apertures in the mesh antennas enables the underlying display material to remain transparent. Geometry 1500*a* is a straightforward rectangular array of meshes. Geometry 1500*b*, by contrast, includes a hexagonal array. Different geometries are possible not only for the mesh elements, but also for the overall shape of the antennas. In some examples, a hybrid array of both mesh and TCO-based elements can be implemented instead. The width of the conductive lines in the mesh as compared to the separation between those lines is illustrated in FIGS. 15A and 15B for ease of viewing. In some embodiments, the width of the conductive lines may actually be much smaller than the distance between the lines, for example an order of magnitude or several orders or magnitude smaller. A length and/or width dimension of either of the antenna elements in FIGS. 15A and 15B may in some embodiments be approximately one half of a wavelength of signals which the antenna element is configured to communicate. Thus, the length of any given conductive line in the mesh may be approximately one half this wavelength.

It may be appreciated that in some examples, the example display-side antenna of FIGS. 5, 6, 7, 8, 9, 10, 11, 12, 13, 14, and/or 15 may replace or be added to one or more of the antenna module(s) of the example apparatus of FIG. 4. In additional or alternative examples, the example display-side antenna of FIGS. 5, 6, 7, 8, 9, 10, 11, 12, 13, 14, and/or 15 may be added to the apparatus of FIG. 4 to further increase overall spherical coverage of the apparatus.

Although the above examples of FIGS. 6, 7, 8, 9, 10, 11, 12, 13, and/or 14 describe the FPC providing a direct connection between the antenna array and the antenna modules or ICs, it may be appreciated that in additional or alternative examples, the connection between the antenna array and the antenna modules may be a capacitive connection and/or a slot coupled connection.

It may be appreciated that the disclosed techniques provide a display-side antenna that may improve coverage of an apparatus, mitigate occurrences of hand blockage (e.g., of RF signals) at the apparatus, and/or may reduce implementation volume within the apparatus. For example, the antenna array disclosed herein may be embedded on the external surface of the display glass (e.g., the glass cover) of the display device and be configured to provide directional radiation coverage along the z-axis, thereby increasing the overall spherical coverage of the apparatus. The positioning of the antenna module below the display device and the use of a conductive transparent material for the antenna array may enable the antenna module and the antenna array to facilitate wireless communication without disturbing the viewing area of the display device (e.g., without reducing the size of the viewing area and/or blocking pixels from presentment of graphical content). For example, while the antenna array may overlap a set of pixels of the panel of the display device, the processing of RF signals may be performed at the antenna module, and, thus, the set of pixels are not blocked from presenting the graphical content. Furthermore, example techniques disclosed herein enable reducing the overall volume of the antenna array and the antenna module within the housing of the apparatus as the antenna array may be positioned outside of the housing of the apparatus and embedded within the glass cover of the display device (e.g., printed on the external surface of the glass cover). Moreover, by connecting the antenna array and the antenna module via a side-fed or via-fed FPC, the FPC is also positioned to facilitate wireless communication without disturbing the viewing area of the display device.

The following examples are illustrative only and aspects thereof may be combined with aspects of other embodiments or teaching described herein, without limitation.

Example 1 is an apparatus for wireless communications, comprising a housing, a display device supported by the housing, the display device including at least a transparent cover, and a panel positioned between the cover and an internal surface of the housing, the panel configured to output graphical content for presentment on the cover via pixels arranged within a visible area of the panel, and an antenna array configured to facilitate wireless communication at the apparatus, the antenna array positioned to overlap a portion of the visible area of the panel and configured to allow graphical content output by the panel to display on the cover at the overlapped portion of the visible area.

In Example 2, the apparatus of Example 1 includes that the cover includes an internal surface facing toward the internal surface of the housing and an external surface opposite the internal surface, and wherein the antenna array is embedded in the external surface of the cover.

In Example 3, the apparatus of any of Examples 1 and 2 includes that the antenna array comprises a conductive transparent material that is printed on the external surface of the cover.

In Example 4, the apparatus of any of Examples 1-3 includes that the antenna array embedded in the cover directs radiation in a direction perpendicular to an external surface of the cover.

In Example 5, the apparatus of any of Examples 1-4 includes that the antenna array includes an antenna feed extending from the respective antennas of the antenna array through a side portion of the cover, the antenna feed configured to carry radio frequency signals to or from the respective antennas.

In Example 6, the apparatus of any of Examples 1-5 includes that the antenna feed is coupled to a first side of a flex printed circuit (FPC), wherein a second side of the FPC is coupled to an antenna module, and wherein the FPC is configured to carry the radio frequency signal between the antenna array and the antenna module to facilitate the wireless communication.

In Example 7, the apparatus of any of Examples 1-6 includes that the FPC is bonded to the cover.

In Example 8, the apparatus of any of Examples 1-7 includes that the second side of the FPC is detachably coupled to the antenna module.

In Example 9, the apparatus of any of Examples 1-8 includes that the second side of the FPC is integrated with the antenna module.

In Example 10, the apparatus of any of Examples 1-9 includes that the antenna module is positioned between an inner surface of the housing and the panel of the display device.

In Example 11, the apparatus of any of Examples 1-10 includes that the FPC is configured to carry the radio frequency signal between the antenna array and the antenna module via a direct connection, a capacitive connection, or a slot coupled connection.

In Example 12, the apparatus of any of Examples 1-11 includes that the antenna array comprises an array of patch antennas or an array of dipole antennas.

In Example 13, the apparatus of any of Examples 1-12 includes that the apparatus comprises a wireless communication device.

In Example 14, the apparatus of any of Examples 1-13 includes that the antenna array comprises millimeter wave antenna elements.

In Example 15, the apparatus of any of Examples 1-14 includes that the antenna feeds are coupled to a first side of a flex printed circuit (FPC), wherein a second side of the FPC is coupled to an RF integrated circuit, and wherein the FPC is configured to carry the radio frequency signal between the antenna array and the RF integrated circuit to facilitate the wireless communication.

In Example 16, the apparatus of any of Examples 1-15 includes that the antenna array includes a first array of antenna elements formed on an internal surface of the cover, and a second array of corresponding antenna elements formed on an external surface of the cover, wherein the antenna elements of the first array are positioned to oppose, at least in part, the corresponding antenna elements of the second array.

In Example 17, the apparatus of any of Examples 1-16 includes that the antenna elements of the second array comprise electrically isolated patch elements.

In Example 18, the apparatus of any of Examples 1-17 includes that the antenna array is positioned within the panel.

In Example 19, the apparatus of any of Examples 1-18 includes that the antenna array is etched into a touch sensor layer in the panel.

In Example 20, the apparatus of any of Examples 1-19 includes that the antenna array is positioned adjacent one or more layers of material configured to provide separation between the antenna array and one or more conducting planes used by the panel to provide the output of graphical content.

In Example 21, the apparatus of any of Examples 1-20 includes that the antenna array is formed within the cover.

In Example 22, the apparatus of any of Examples 1-21 includes that the antenna array is formed within the cover using a laminate or using a transparent adhesive.

In Example 23, the apparatus of any of Examples 1-22 includes that one or more antennas of the antenna array comprise a mesh geometry using non-transparent conductors.

In Example 24, the apparatus of any of Examples 1-23 includes that one or more antennas of the antenna array is formed on an inner surface of the transparent cover facing the display device.

In Example 25, the apparatus of any of Examples 1-24 includes that the antenna array includes an antenna feed extending from the respective antennas of the antenna array through a via in the transparent cover, the antenna feed configured to carry radio frequency signals to or from the respective antennas.

Example 26 includes an apparatus for wireless communication, comprising a housing, means for presenting graphical content, the means for presenting being disposed in the housing, and means for transmitting or receiving wireless millimeter wave signals, the means for transmitting or receiving being disposed on a side of the means for presenting which is visible to a user of the apparatus.

In Example 27, the apparatus of Example 26 includes means for electronically processing the millimeter wave signals, the means for electronically processing being disposed within the housing on a side of the means for presenting opposite the side which is visible to the user.

In Example 28, the apparatus of any of Examples 26 and 27 includes means for electronically processing the millimeter wave signals, the means for electronically processing being disposed within the housing between the means for presenting and a top or bottom housing portion.

Example 29 is an apparatus for wireless communication, comprising a housing, a display device comprising a transparent cover, and a panel underneath the cover and configured to output graphical content within a visible area of the panel, and an antenna array formed in the cover and configured to facilitate wireless communication, the antenna array overlapping a portion of the visible area of the panel while being transparent at the overlapped portion.

In Example 30, the apparatus of Example 29 includes that the cover includes an internal surface facing toward an interior of the housing and an external surface opposite the internal surface, and wherein the antenna array is formed on the external surface of the cover.

In Example 31, the apparatus of any of Examples 29 and 30 includes that the cover includes an internal surface facing toward an interior of the housing and an external surface opposite the internal surface, and wherein the antenna array is formed on the internal surface of the cover.

In Example 32, the apparatus of any of Examples 29-31 includes that the antenna array comprises a conductive transparent material (CTO) that is printed on the internal surface of the cover.

In Example 33, the apparatus of any of Examples 29-32 includes that respective antennas of the antenna array are coupled to first ends of corresponding antenna feeds that extend from the respective antennas of the antenna array through a side portion of the cover or a via in the cover.

In Example 34, the apparatus of any of Examples 29-33 includes that second ends of the corresponding antenna feeds are coupled to a first side of a flex printed circuit (FPC), wherein a second side of the FPC is coupled to an antenna circuit, and wherein the FPC is configured to carry the radio frequency signal between the antenna array and the antenna circuit to facilitate the wireless communication.

In Example 35 the apparatus of any of Examples 29-33 includes that the antenna circuit comprises a connector configured to bond the FPC with input/output pads of the antenna circuit.

In Example 36, the apparatus of any of Examples 29-35 includes that the second side of the FPC is detachably coupled to the antenna circuit.

In Example 37, the apparatus of any of Examples 29-36 includes that the antenna circuit comprises at least one integrated circuit.

In Example 38, the apparatus of any of Examples 29-37 includes that the antenna array comprises an array of patch antennas or an array of dipole antennas.

In Example 39, the apparatus of any of Examples 29-38 includes that the antenna array includes a first array of antenna elements formed on an internal surface of the cover, and a second array of corresponding antenna elements formed on an external surface of the cover, wherein the antenna elements of the first array are positioned to oppose, at least in part, the corresponding antenna elements of the second array.

In Example 40, the apparatus of any of Examples 29-39 includes that the antenna elements of the second array comprise electrically isolated patch elements.

In Example 41, the apparatus of any of Examples 29-40 includes that the antenna array is positioned within the panel.

In Example 42, the apparatus of any of Examples 29-41 includes that the antenna array is etched into and integrated with a touch sensor in the panel.

In Example 43, the apparatus of any of Examples 29-41 includes that the antenna array is positioned adjacent one or more layers of material configured to provide separation between the antenna array and one or more conducting planes used in the output of graphical content.

In Example 44, the apparatus of any of Examples 29-42 includes that each of the antennas in the array is coupled to one end of a respective antenna feed, and another end of the respective antenna feeds is coupled to an flex printed circuit (FPC)

In Example 45, the apparatus of any of Examples 29-44 includes that the antenna array is formed within the cover.

In Example 46, the apparatus of any of Examples 29-45 includes that the antenna array is formed within the cover using a laminate or using a transparent adhesive.

In Example 47, the apparatus of any of Examples 29-46 includes that one or more antennas of the antenna array comprise a mesh geometry using non-transparent conductors.

Example 48 includes an apparatus for wireless communication, comprising a transparent antenna element embedded in a display device, the antenna element including an antenna feed extending from the antenna element, an antenna circuit configured to facilitate wireless communication, and a flex printed circuit (FPC) bonded to the display device and including a first side connected to the antenna feed and a second side connected to the antenna circuit.

In Example 49, the apparatus of Example 48 includes that the antenna element is formed on an inner surface of a transparent cover of the display device facing an interior of a display panel of the display device.

In Example 50, the apparatus of any of Examples 48 and 49 includes another antenna element formed on an external surface of the cover, the another antenna element being electrically isolated from the antenna element.

In Example 51, the apparatus of any of Examples 48-50 includes that the antenna element is integrated within the display panel.

In Example 52, the apparatus of any of Examples 48-51 includes that the antenna element is formed as part of a touch sensor within the display panel.

In Example 53, the apparatus of any of Examples 48-52 includes that the antenna element comprises a mesh geometry using non-transparent material.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. An apparatus for wireless communication, comprising:
   a housing;
   a display device supported by the housing, the display device including at least:
   a transparent cover; and
   a panel positioned between the cover and an internal surface of the housing, the panel configured to output graphical content for presentment on the cover via pixels arranged within a visible area of the panel; and
   an antenna array configured to facilitate wireless communication at the apparatus, the antenna array positioned to overlap a portion of the visible area of the panel and configured to allow graphical content output by the panel to display on the cover at the overlapped portion of the visible area, wherein the antenna array includes a first array of antenna elements formed on an internal surface of the cover and a second array of corresponding antenna elements formed on an external surface of the cover, wherein the antenna elements of the first array are positioned to oppose, at least in part, the corresponding antenna elements of the second array.

2. The apparatus of claim 1, wherein the antenna array includes antenna feeds extending from the respective antennas of the antenna array, the antenna feeds configured to carry radio frequency signals to or from the respective antennas.

3. The apparatus of claim 2, wherein the antenna feeds are coupled to a first side of a flex printed circuit (FPC), wherein a second side of the FPC is coupled to an antenna module, and wherein the FPC is configured to carry the radio frequency signals between the antenna array and the antenna module to facilitate the wireless communication.

4. The apparatus of claim 3, wherein the FPC is bonded to the cover.

5. The apparatus of claim 3, wherein the second side of the FPC is detachably coupled to the antenna module.

6. The apparatus of claim 3, wherein the second side of the FPC is integrated with the antenna module.

7. The apparatus of claim 3, wherein the antenna module is positioned between an inner surface of the housing and the panel of the display device.

8. The apparatus of claim 3, wherein the FPC is configured to carry the radio frequency signals between the antenna array and the antenna module via a direct connection, a capacitive connection, or a slot coupled connection.

9. The apparatus of claim 2, wherein the antenna feeds are coupled to a first side of a flex printed circuit (FPC), wherein a second side of the FPC is coupled to an RF integrated circuit, and wherein the FPC is configured to carry the radio frequency signals between the antenna array and the RF integrated circuit to facilitate the wireless communication.

10. The apparatus of claim 1, wherein the antenna array comprises an array of Patch antennas or an array of dipole antennas.

11. The apparatus of claim 1, wherein the apparatus comprises a wireless communication device.

12. The apparatus of claim 1, wherein the antenna array comprises millimeter wave antenna elements.

13. The apparatus of claim 1, wherein the antenna elements of the second array comprise electrically isolated patch elements.

14. The apparatus of claim 1, wherein the antenna array is positioned adjacent one or more layers of material configured to provide separation between the antenna array and one or more conducting planes used by the panel to provide the output of graphical content.

15. The apparatus of claim 1, wherein one or more antennas of the antenna array comprise a mesh geometry using non-transparent conductors.

16. An apparatus for wireless communication, comprising:
a housing;
means for presenting graphical content, the means for presenting being disposed in the housing;
means for transmitting or receiving wireless millimeter wave signals, the means for transmitting or receiving being disposed on a side of the means for presenting which is visible to a user of the apparatus; and
a flex printed circuit (FPC),
wherein a first side of the FPC is coupled to the means for transmitting or receiving,
wherein a second side of the FPC is coupled to a module, the module comprising means for electronically processing the millimeter wave signals, and
wherein the FPC is configured to carry the millimeter wave signals between the means for electronically processing and the means for transmitting or receiving to facilitate the wireless communication.

17. The apparatus of claim 16, wherein the means for presenting comprises a transparent cover, the cover including an internal surface facing toward the internal surface of the housing and an external surface opposite the internal surface, and wherein the means for transmitting or receiving are embedded in the external surface of the cover.

18. The apparatus of claim 17, wherein the means for transmitting or receiving comprises a conductive transparent material that is printed on the external surface of the cover.

19. The apparatus of claim 17, wherein the means for transmitting or receiving embedded in the cover directs radiation in a direction perpendicular to an external surface of the cover.

20. The apparatus of claim 16, wherein the means for presenting comprises a panel configured to output the graphical content and the means for transmitting or receiving are positioned within the panel.

21. The apparatus of claim 20, wherein the means for transmitting or receiving are etched into a touch sensor layer in the panel.

22. The apparatus of claim 16, wherein the means for presenting comprises a transparent cover and the means for transmitting or receiving are formed within the cover.

23. The apparatus of claim 22, wherein the means for transmitting or receiving are formed within the cover using a laminate or using a transparent adhesive.

24. The apparatus of claim 16, wherein the means for presenting comprises a transparent cover and a panel configured to output the graphical content and the means for transmitting or receiving are formed on an inner surface of the transparent cover facing the panel.

25. The apparatus of claim 16, wherein the means for presenting comprises a transparent cover, and the means for transmitting or receiving includes antenna feeds extending through respective vias in the transparent cover, the antenna feeds configured to carry radio frequency signals.

26. The apparatus of claim 16, the module being disposed within the housing between the means for presenting and a top or bottom housing portion.

27. The apparatus of claim 16, wherein the module comprises an array of antennas configured to provide directional radiation coverage from a top, side, or bottom portion of the housing.

28. The apparatus of claim 27, wherein the array of antennas comprises a first linear array of antennas, and wherein the means for transmitting or receiving comprises a second linear array of antennas.

* * * * *